US009256955B2

(12) United States Patent
O'Gorman et al.

(10) Patent No.: US 9,256,955 B2
(45) Date of Patent: Feb. 9, 2016

(54) SYSTEM AND METHOD FOR PROCESSING VISUAL INFORMATION FOR EVENT DETECTION

(71) Applicants: Lawrence O'Gorman, Madison, NJ (US); Tin K. Ho, Milburn, NJ (US); Yafeng Yin, Harrison, NJ (US)

(72) Inventors: Lawrence O'Gorman, Madison, NJ (US); Tin K. Ho, Milburn, NJ (US); Yafeng Yin, Harrison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/416,195

(22) PCT Filed: Mar. 13, 2013

(86) PCT No.: PCT/US2013/030700
§ 371 (c)(1),
(2) Date: Jan. 21, 2015

(87) PCT Pub. No.: WO2014/074139
PCT Pub. Date: May 15, 2014

(65) Prior Publication Data
US 2015/0235379 A1    Aug. 20, 2015

Related U.S. Application Data

(60) Provisional application No. 61/722,885, filed on Nov. 6, 2012.

(51) Int. Cl.
*G06K 9/00*    (2006.01)
*G06T 7/20*    (2006.01)
*H04N 5/14*    (2006.01)

(52) U.S. Cl.
CPC .......... *G06T 7/2033* (2013.01); *G06K 9/00718* (2013.01); *G06K 9/00744* (2013.01); *G06T 7/2066* (2013.01); *H04N 5/144* (2013.01); *H04N 5/147* (2013.01); *G06K 2009/00738* (2013.01); *G06T 2207/10016* (2013.01)

(58) Field of Classification Search
CPC ................ G06K 2009/00738; G06K 9/00718; G06K 9/00744; G06T 2207/10016; G06T 7/2033; G06T 7/2066; H04N 5/144; H04N 5/147

See application file for complete search history.

(56) References Cited

U.S. PATENT DOCUMENTS 5,109,425 A * 4/1992 Lawton ................. G06T 7/0071
348/25
5,387,947 A   2/1995 Shin
5,854,856 A * 12/1998 Moura ..................... G06T 9/20
348/415.1

(Continued)

OTHER PUBLICATIONS

International Search Report PCT/ISA/210 for International Application No. PCT/US2013/030700 Dated Aug. 5, 2013.

*Primary Examiner* — Tom Y Lu
(74) *Attorney, Agent, or Firm* — Harness, Dickey & Pierce, P.L.C.

(57) ABSTRACT

A system and method processes visual information including at least one object in motion. The visual information is processed by locating at least one spatial edge of the object, generating a plurality of spatio-temporal gradients for the at least one spatial edge over N frames, and then generating motion blur images from the spatio-temporal gradients. A regression analysis is performed on the motion blur images to determine direction of motion information of the object, and scene activity vectors are then generated for the N frames based on the direction of motion information. An event is detected in the visual information based on the scene activity vectors.

21 Claims, 21 Drawing Sheets

(56) References Cited

U.S. PATENT DOCUMENTS

| | | | |
|---|---|---|---|
| 6,381,285 B1* | 4/2002 | Borer | G06T 7/2066 348/E5.066 |
| 2004/0165781 A1* | 8/2004 | Sun | G06T 7/20 382/236 |
| 2005/0175091 A1 | 8/2005 | Puri et al. | |
| 2007/0126932 A1 | 6/2007 | Bhat et al. | |
| 2007/0217700 A1 | 9/2007 | Nagasaka | |
| 2010/0245670 A1 | 9/2010 | Takeda et al. | |
| 2010/0245672 A1 | 9/2010 | Erdler et al. | |
| 2011/0141251 A1* | 6/2011 | Marks | G06T 1/0014 348/61 |
| 2011/0299739 A1* | 12/2011 | Sebe | G06T 7/2066 382/107 |
| 2012/0075535 A1 | 3/2012 | Van Beek | |

* cited by examiner

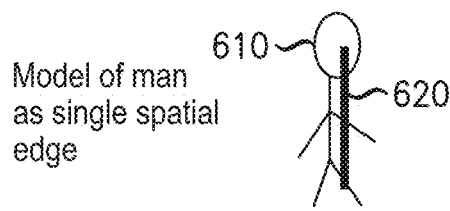
FIG. 6A
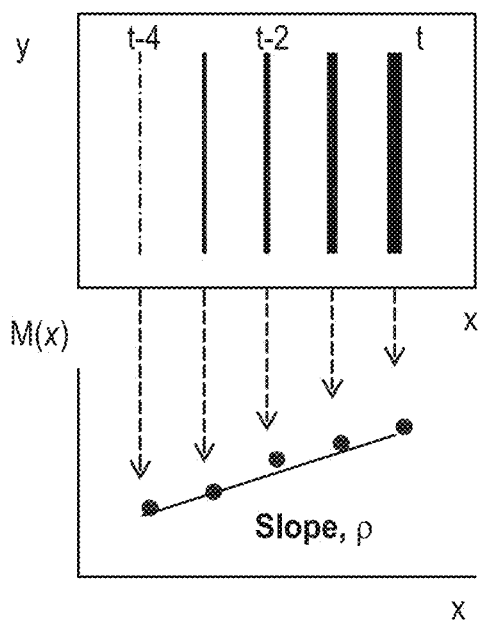
FIG. 6B
FIG. 6C
FIG. 6D

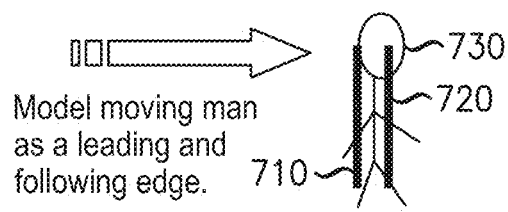
FIG. 7A
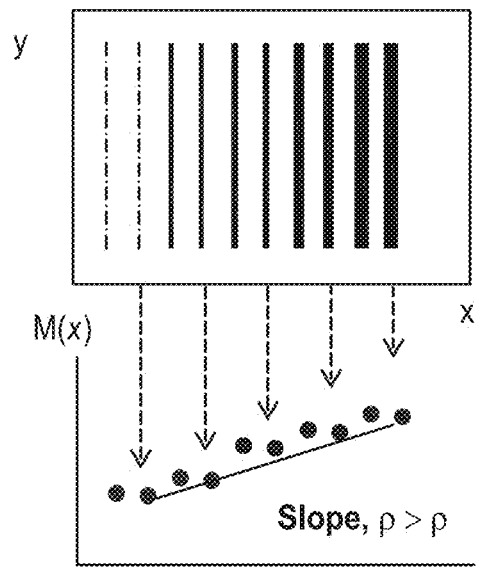
FIG. 7B
FIG. 7C
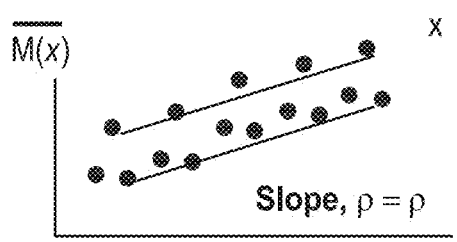
FIG. 7D

| Level | Sidelength | Blocks | Features |
|---|---|---|---|
| 0 | N | 1 | 4 |
| 1 | N/2 | (2+1)^2 | 36 |
| 2 | N/4 | 4(2+1)^2 | 144 |
| 3 | N/8 | 16(2+1)^2 | 576 |
| ... | | | |
| L | N/2^L | B =9x2^[2(L-1)] | 4B |
| Total | | 3[4^L2-4^(L1-1)] | |

SAV is a multi-scale vector of features, $SAV(t) = \{F[(j), B(k)]\}$,
  where Levels: $L1 < j < L2$
       Blocks per Level: $0 < k < B(L)$ and, $F(j,k) = \{\theta, v, c, confidence\}$ is featured
   tuple where:
   $\theta$ is dominant direction of block
   $v$ is average velocity of block
   $c$ is dominant color of block
   *confidence* is measure of block
                     consistency
   and $(x,y)$ is implicit in the
                  Level/Block structure

*FIG. 17*

SYSTEM AND METHOD FOR PROCESSING VISUAL INFORMATION FOR EVENT DETECTION

CROSS-REFERENCE TO RELATED APPLICATION

This application is a national phase under 35 U.S.C. §371 of PCT International Application No. PCT/US2013/030700 which has an International filing date of Mar. 13, 2013, which claims benefit to provisional U.S. Patent Application Ser. No. 61/722,885, filed on Nov. 6, 2012, the contents of each of which are incorporated herein by reference in its entirety.

BACKGROUND OF THE INVENTION

One or more embodiments relate to processing visual information.

Processing techniques have been developed to detect features in video using, for example, Mixture-of-Gaussian (MOG), Hierarchical Bayesian, and Hidden Markov models. The features are located in one frame and then an attempt is made to find matching features in a subsequent adjacent frame or by performing block matching between adjacent frames. These techniques have proven to be time-consuming because of computational complexity and also have been found to be prone to errors as a result of lighting changes, occlusion, rotation, scale difference and other effects.

Additionally, these techniques perform a bottom-up approach to feature finding. Such an approach locates features based on regions, which, for example, may be pre-chosen fixed blocks of n×n size. A bottom-up approach also detects, segments, and tracks one feature and then attempts to detect, segment, and track increasingly greater numbers of features. When the number of features becomes large, objects cannot be detected or tracked with any degree of accuracy. Bottom-up approaches, therefore, have proven unsuitable for many applications.

SUMMARY OF THE INVENTION

In accordance with one embodiment, a method is provided for detecting features and events accurately in a way that achieves low error rates.

In accordance with another embodiment, a method is provided for detecting features and events in real-time which may prove beneficial in emergency, public safety, and other applications.

In accordance with another embodiment, a method is provided for detecting a large number of features and events in video without losing accuracy as the number of features or events increases.

In accordance with another embodiment, a method is provided for detecting features and events in complex scenes or crowds with low error rate.

In accordance with another embodiment, a method is provided for detecting features/events using unsupervised learning for trends and anomalies.

In accordance with another embodiment, a method is provided for detecting features and events by using a coherent statistical approach that involves top-down grouping and non-discrete tracking of features in visual information.

In accordance with another embodiment, a method is provided for detecting features and events using a top-down approach based on the location of motion edges in visual information, instead of pixels and more specifically pre-chosen regions of a fixed number of pixels.

In accordance with another embodiment, a method is provided for locating motion edges based on the generation of spatio-temporal (space-time) gradients to be used in detecting higher level motion features in visual information.

In accordance with another embodiment, a method is provided for performing event detection in visual information based on locating motion edges, instead of pre-chosen fixed spatial regions or pre-chosen fixed temporal lengths (clips or cuboid lengths). Instead, in accordance with at least one embodiment, a multi-resolution spatial representation is used.

In accordance with another embodiment, a method is provided for performing event detection based on the location of motion edges or activities in visual information rather than a pre-chosen fixed number of pixels.

In accordance with another embodiment, a method is provided for performing event detection in visual information using a statistical approach to find motion of features in frames, without matching features between frames.

In accordance with another embodiment, the aforementioned methods are implemented while maintaining full temporal resolution so that event onsets and endings can be detected and measured with high precision.

In accordance with one embodiment, a method for processing information includes receiving visual information including at least one object in motion, locating at least one spatial edge of the object in the visual information, generating a plurality of spatio-temporal gradients for the at least one spatial edge over N frames where $N \geq 3$, generating motion blur images from the spatio-temporal gradients, performing a regression analysis on the motion blur images to determine direction of motion information of the object throughout the N frames, generating scene activity vectors for the N frames based on the direction of motion information, and detecting an event in the visual information based on the scene activity vectors generated for the N frames.

The spatio-temporal gradients may be generated by obtaining a spatial edge image for each of the N frames, and determining the spatio-temporal gradients based on a corresponding one of the spatial edge images and a moving average. The moving average is based on a background edge image.

The scene activity vectors may be generated by dividing each of the N frames into blocks, determining feature parameters for each block, generating a scene activity vector for each block, and determining scene activity vectors for the N frames based on the scene activity vectors generated for each block of the N frames.

The feature parameters may include one or more of a first parameter based on a sum of non-zero direction values in a corresponding one of the blocks, a second parameter based on dominant direction in a corresponding one of the blocks, a third parameter based on a dominant color in a corresponding one of the blocks, a fourth parameter based an average velocity of movement in a corresponding one of the blocks, a fifth parameter based on a degree of consistency or uniformity of motion directions of the object in a corresponding one of the blocks, a sixth parameter based on density, or a seventh parameter based on frequency in time.

In accordance with another embodiment, an apparatus for processing information includes a storage area configured to store a control program and a controller configured to process visual information based on the control program. The controller may process the visual information by locating at least one spatial edge of an object in visual information, generating a plurality of spatio-temporal gradients for the at least one spatial edge over N frames where $N \geq 3$, generating motion blur images from the spatio-temporal gradients, performing a regression analysis to determine direction of motion information of the object throughout the N frames, generating scene activity vectors for the N frames based on the direction of motion information, and detecting an event in the visual information based on the scene activity vectors generated for the N frames.

The controller may generate the spatio-temporal gradients by obtaining a spatial edge image for each of the N frames and determining the spatio-temporal gradients based on a corresponding spatial edge image and a moving average.

The controller may generate the scene activity vectors by dividing each of the N frames into blocks, determining feature parameters for each block, generating a scene activity vector for each block, and determining scene activity vectors for the N frames based on the scene activity vectors generated for each block of the N frames.

In accordance with a further embodiment, a system is provided. The system includes the apparatus for processing information such as described above, one or more video sources configured to supply the visual information, one or more feedback devices configured to generate feedback information, and a feedback generator interface configured to present output from the processing apparatus. The feedback generator interface is further configured to control the feedback devices to generate the feedback information.

In accordance with another embodiment, a non-transitory computer readable medium is provided. The non-transitory computer readable medium stores an executable set of instruction, which upon execution configure a processing apparatus to perform any of the described method embodiments.

Another embodiment is directed to a computer program adapted to perform any of the described and/or claimed methods. For example, a computer program adapted to perform the method including the steps of receiving visual information including at least one object in motion; locating at least one spatial edge of the object in the visual information; generating a plurality of spatio-temporal gradients for the at least one spatial edge over N frames, where N≥3; generating motion blur images from the spatio-temporal gradients; performing a regression analysis on the motion blur images to determine direction of motion information of the object throughout the N frames; generating scene activity vectors for the N frames based on the direction of motion information; and detecting an event in the visual information based on the scene activity vectors generated for the N frames.

BRIEF DESCRIPTION OF THE DRAWINGS

The present invention will be more fully understood from the detailed description below and the accompanying drawings, wherein like elements are represented by like reference numerals, which are given by way of illustration only and thus are not limiting of the present invention.

FIGS. 6A-6D shows operations included in one embodiment for generating scene parameters for a scene activity vector.

FIGS. 7A-7D show operations included in another embodiment for generating scene parameters for a scene activity vector.

FIG. 17 shows an example of scene activity vector parameters.

DETAILED DESCRIPTION OF THE EMBODIMENTS

Figure 1:
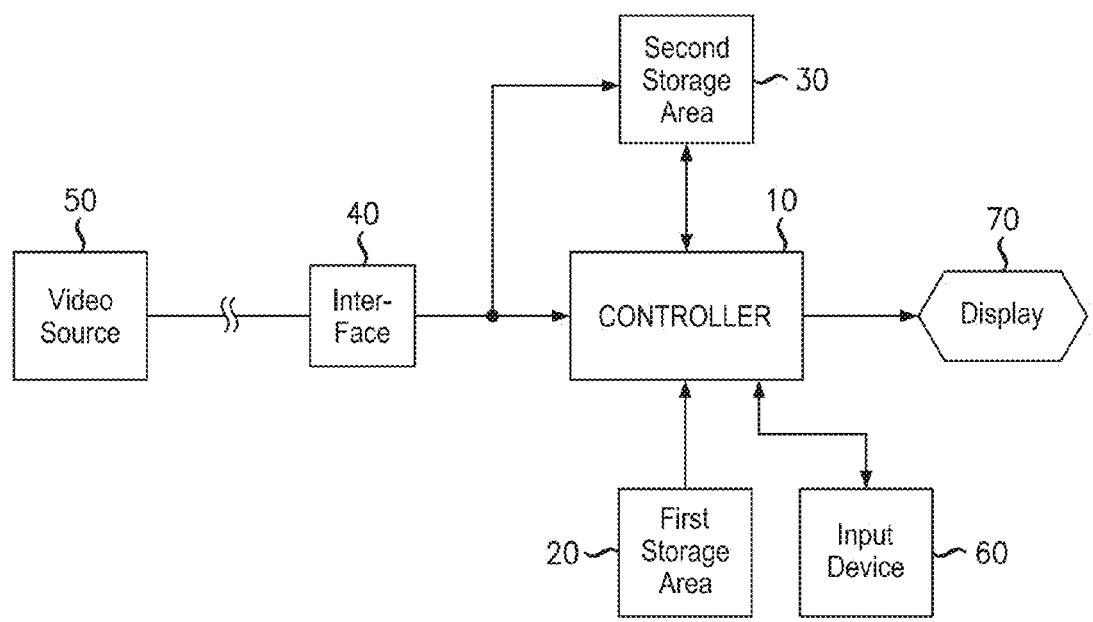
FIG. 1 shows an embodiment of an apparatus for processing information including visual information.

Various example embodiments will now be described more fully with reference to the drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or a combination of these. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code or code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "terminal" may be synonymous with a mobile user, mobile station, mobile terminal, user, subscriber, wireless terminal, user equipment and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the terminal may be referred to as downlink or forward link communication. Communication from the terminal to the base station may be referred to as uplink or reverse link communication.

FIG. 1 shows an embodiment of an apparatus for processing information including visual information. The visual information may be video, graphics, or a combination thereof received from a variety of sources. The visual information may be processed to perform detection, monitoring, and/or tracking functions as will be described in greater detail below.

As shown in FIG. 1, the apparatus includes a controller 10, a first storage area 20, and a second storage area 30. These features may be included in a processing system which, for example, may be a personal computer, smart phone, pad- or pod-type device, tablet, gaming system, public or private control system, safety system or a portable or fixed device for processing information.

The controller 10 may include a microprocessor and/or one or more other control circuits that operate based on control program(s) stored in the first storage area 20. The control program(s) are executed by controller 10 to perform certain functions to be described in greater detail. The first storage area 20 may be a read-only memory, hard disk drive, or other type of storage area.

The second storage area 30 stores information including visual information received, for example, through interface 40. The second storage area may be a random access memory or other type of volatile memory, hard disk drive, or database. The first and second storage areas 20 and 30 may be components within the apparatus or one or both of these storage areas may be coupled to the apparatus through appropriate connectors or other interfaces.

For example, in a gaming application, the information to be processed by controller 10 may be video and/or graphics information stored on or generated based on data from a compact disk (CD) or other removable storage media coupled to the apparatus. Or, the visual information may be received through the Internet or other network in a streaming or download format.

As mentioned, in at least one embodiment controller 10 receives visual information through interface 40. When the visual information includes video, the interface 40 may be coupled to a video source 50. The video source may be included in the apparatus or may be coupled to the apparatus, either locally or through a remote feed or connection. For example, the video source may be a closed-circuit, surveillance, or web camera coupled to the apparatus through a network or the video source may be an internal camera of the apparatus.

The apparatus may further include or be coupled to an input device 60 for receiving commands, instructions or other signals for input into the controller 10. The input device, for example, may be a keyboard, keypad, mouse, game controller, or other device operable by a user for inputting signals to the controller for performing one or more functions based on the control program(s) in first storage area 20.

The apparatus may further include or be coupled to a display 70 for outputting results of the processing functions performed by controller 10. In accordance with one embodiment, the display outputs event detection information, emergency or alert information, statistical information and/or image, video and/or textual information corresponding to the functions performed by the controller 10. Specific examples of the displayed information will be described in greater detail.

Figure 2:
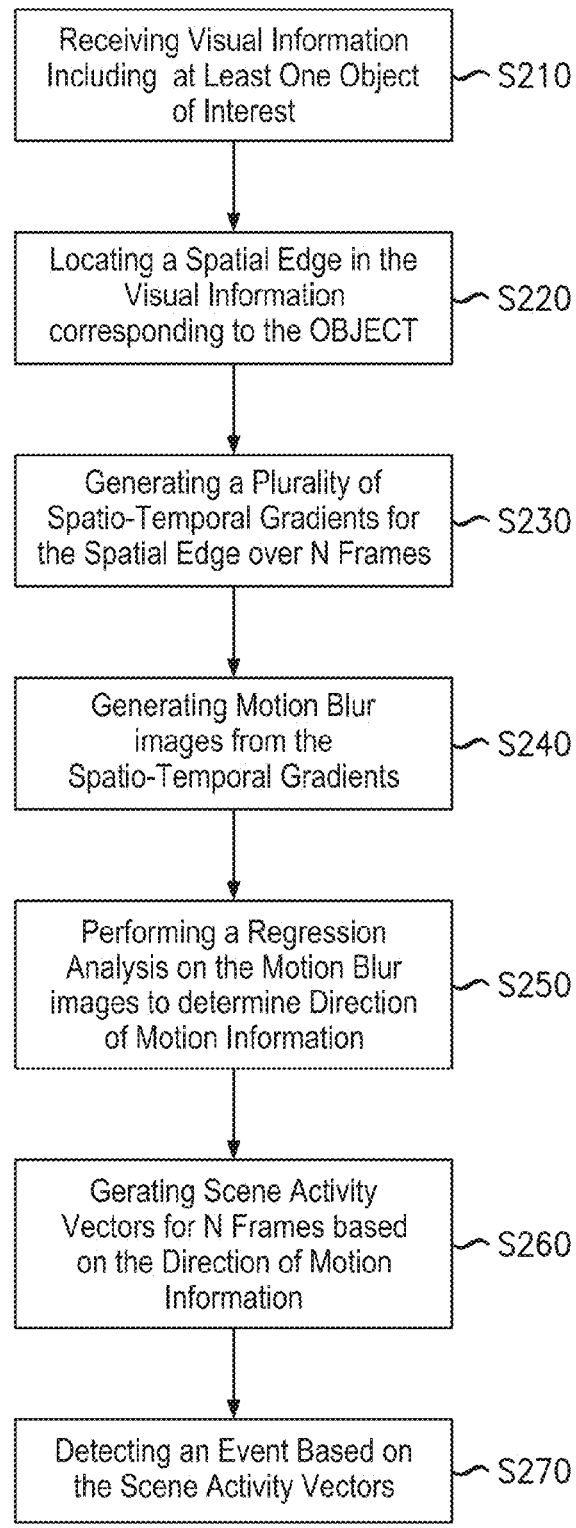
FIG. 2 shows operations included in an embodiment of a method for processing information including visual information.

FIG. 2 shows one embodiment of a method for processing information including visual information. This method may be performed by the apparatus shown in FIG. 1 or a different apparatus. In accordance with this embodiment, the visual information is processed to perform detection of an event. The event may be one or more persons or a crowd of people, motion of a person or object, an emergency situation or condition, a gaming activity, the tracking of a person or object, behavioral recognition, pattern recognition, or other types of activities, conditions or events. Specific example embodiments will be discussed in greater detail below.

In performing event detection, an initial operation includes receiving visual information that has at least one object of interest. (S210). The visual information may be video, graphics, or a combination of these. In one embodiment, the visual information includes video from a video source. The video source may be a camera which receives video in real- or near real-time for processing or the video may be pre-recorded and stored to be subsequently analyzed for event detection. Additionally, or alternatively, the visual information may be computer-generated video, data, or graphics to be used, for example, in a gaming or other application.

The object in the visual information may be different depending on the application. For example, the object may be a person or group of people or crowd in a public or private area, either indoors or outdoors. Additionally, or alternatively, the object may be a non-human subject to be monitored or tracked or whose presence or movement is to otherwise be determined. Alternatively, or additionally, the object may be the location or movement of a graphical object such as may appear, for example, in a game application.

Once the visual information has been received, the method be performed in at least three stages: 1) motion feature calculation, 2) scene activity vector determination, and 3) event detection. The stages may be performed in the manner described below. In describing the operations in these stages, it will be assumed that the visual information is video information. However, these stages may apply equally to graphics or other types of visual information either taken alone or in combination with video.

Motion Feature Calculation

The first stage includes locating at least one spatial edge in the visual information (S220). The spatial edge may correspond to an object of interest; however, no a priori knowledge of the object may be known to the method. Rather, the first stage of the method merely locates spatial edges and then a decision is made in a later stage as to whether the edge corresponds to an event or not. (For illustrative purposes, the spatial edge will be discussed relative to an object of interest, and more specifically detecting an event based on a status, condition, or activity of the object).

The spatial edge may be located, for example, using a minimal region edge detector, one example of which is a detector that locates edges using the Sobel edge detection technique. This spatial edge may be located in a first frame of the received video, or the operation of locating this spatial edge may be initiated at a certain time or after a certain number of frames in the video has passed. This certain time or number of frames may be determined by the control program, may be performed in response to a control signal generated by the controller, and/or may be initiated in response to a control signal received through the input device based on an action by a user.

The locating operation may involve detecting only one spatial edge of the object or may involve detecting multiple spatial edges of the object. For example, in the case where the object is a person or crowd of people, the location operation may locate multiple edges corresponding, for example, to all or a portion of the outline or silhouette of the person and/or outlines or edges of various persons in the crowd. Additionally, or alternatively, the locating operation may involve detecting one or more spatial edges of multiple objects in a same frame of the video, where the objects may be multiple people, structures, vehicles, or other subject, or a combination thereof.

After at least one spatial edge has been located in a frame of video, the method continues by generating a plurality of spatio-temporal gradients for the at least one spatial edge over N frames (S230). The value of N may be two or more, an in one embodiment N≥3. Additionally, or alternatively, the number of frames may be determined based on a time period relative to the video. The time period may span the entire length of the video or may correspond to a certain time of interest designated or otherwise controlled based on, for example, a user input signal. The likelihood of event detection may improve when increasing numbers of frames are taken into consideration.

In one embodiment, the spatio-temporal gradients are generated as time differences "Δ" of spatial differences according to the following equation:

$$G_t(x, y) = \frac{\Delta}{\Delta t}\left(\frac{\Delta I(x, y)}{\Delta x}, \frac{\Delta I(x, y)}{\Delta y}\right) \quad (1)$$

where Gt(x,y) is a spatio-temporal gradient at frame t and location (x,y) in the frame, I(x,y) is light intensity, ΔI(x,y)/Δx is spatial edge in x (and similarly in y). As indicated, the spatial edge may be found, for example, by a minimal region edge detector such as a Sobel detector as previously indicated.

In Equation (1), the notation $$\frac{\Delta}{\Delta t}$$

denotes that the gradients are computed based on spatial changes in the located edge or edges over a period of time, which may be measured in terms of a plurality of frames. The plurality of frames may include as few as two frames or greater than two frames. When the period of time is significant, over seconds or minutes, hundreds of frames may be taken into consideration. In one application, continuous analysis of video may be performed over a period of 24 hours or longer, especially in a public safety application of the method.

In generating the gradients, the difference (or changes) in the spatial edge(s) may be based on a difference between a current spatial edge image and an exponential moving average of that image in a same or other frame. The exponential moving average may, for example, correspond to a background edge image in the same frame as the spatial x and y edges that have been located. The gradients may be expressed as a plurality of gradient images over the time period (plurality of frames) being taken into consideration.

Figure 3:
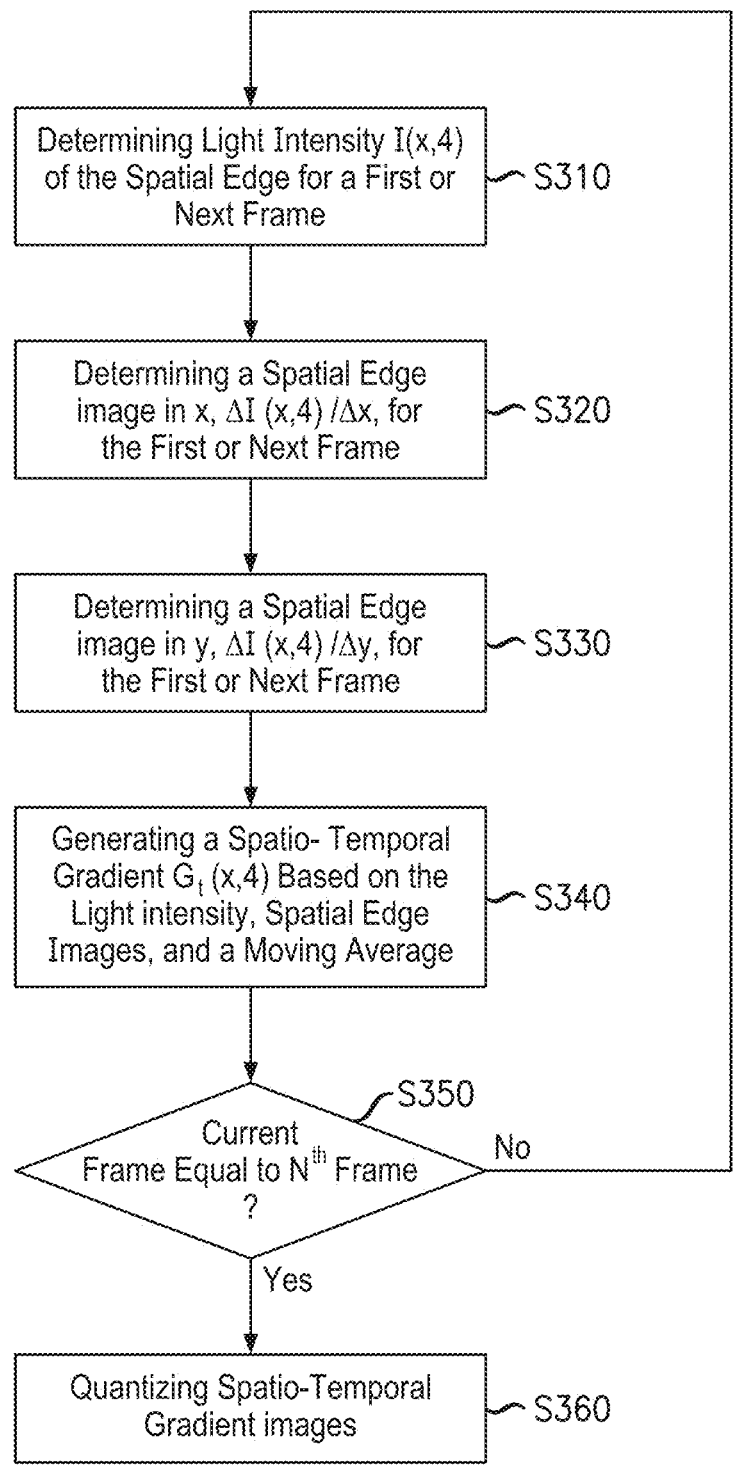
FIG. 3 shows operations included in one embodiment of a method for generating spatio-temporal gradients for a video frame.

FIG. 3 shows an example of how the gradient images $G_t(x,y)$ may be generated over N frames based on Equation (1). Initially, light intensity I(x,y) corresponding to a spatial edge is determined in a first frame (S310). When multiple spatial edges have been located, light intensities may be determined for each of these edges. Once the light intensity I(x,y) for each spatial edge has been determined, a spatial edge image $$\frac{\Delta I(x, y)}{\Delta x}$$

in x is determined for the frame (S320). This operation is followed by determining a spatial edge image $$\frac{\Delta I(x, y)}{\Delta y}$$

in y for the frame (330).

In a next operation, a spatio-temporal gradient $G_t(x,y)$ is generated based on the light intensity and spatial edge images in x and y and a moving average which corresponds, for example, to a background edge image (S340). These operations continue until spatio-temporal gradients which may be expressed as corresponding gradient $G_t(x,y)$ images are generated for the time period Δt (number of frames) under consideration (S350).

After the gradient $G_t(x,y)$ images (or difference images) are obtained, the images may be quantized (S360) based on one or more threshold values with respect to a chosen value τ to obtain binary images of significant edges. The quantization may be performed based on Equation (2):

$$G'_t(x,y)=1 \text{ if } G_t>\tau, 0 \text{ otherwise} \quad (2)$$

A more specific description of this quantization process may be performed based on Equation (3), where ∇E corresponds to the difference in gradient images between time t and t−1.

$$\begin{aligned}\nabla E(x, y, t) &= 0, \text{ if } E(x, y, t) \quad (3)\\ &= B(x, y, t-1)\\ &= 0\\ &= 1, \text{ if } E(x, y, t)\\ &= B(x, y, t-1) \neq 0\\ &= 2, \text{ if } E(x, y, t) \neq B(x, y, t-1)\end{aligned}$$

In the above equations, the time t−1 may correspond to a frame that occurs before the frame corresponding to time t. This frame may be an adjacent frame before the frame corresponding to t or one or more intervening frames may exist between the frames corresponding to times t and t−1.

Also, in Equation (3), the notation B(x,y,t−1) corresponds to a gradient of the spatial edge at time t−1 and the notation E(x,y,t) corresponds to a gradient of the spatial edge at time t.

Thus, ∇E represents a gradient indicative of a difference in this spatial edge in corresponding frames, which, for example, may be generated as a result of movement of the spatial edge between these frames. The spatial edge may correspond to an n×n number of pixels which includes the spatial edge that has previously been located.

Given the conditions in Equation (3) if there is no difference between the spatial edge E and B (or at least the difference in this spatial edge falls below a threshold), then the gradient image ∇E is quantized to a value of 0. If there is a difference between these spatial edges, the gradient image is quantized to a value of 1. If the spatial images do not appear in both of the frames corresponding to times t and t−1, then the gradient image is quantized to a value of 2.

Returning to FIG. 2, in a next operation, a plurality of motion blur images are generated from the spatio-temporal gradients (S240). More specifically, the motion blur images may be generated by combining respective quantized gradient images in each frame with monotonically decaying weights $w_k$ of k previous frames as indicated in Equations (4) and (5):

$$B_t(x, y) = \bigcup_{k=1}^{K} w_k G'_{t-k}(x-y), \quad (4)$$

$$w_k = W - k + 1, \quad (5)$$
$$1 \leq k \leq K,$$
$$W \geq K$$

In Equation (4), a "weighted logical OR" function is performed where the result is not 0 or 1, but $w_k$ if $G'_{t-k}=1$, or 0 otherwise. (If more than one $G'_{t-k}$ is equal to 1, then the lowest value weight corresponding to the longest decayed edge is chosen.) Thus, in accordance with one embodiment, a motion blur image contains a high value for a spatial edge in a current frame, and 1 less for the previous frame, etc., for K frames. This image looks like a single snapshot of edges of an object that moved causing blurring.

In a next operation, a regression analysis is performed on the motion blur images to determine direction of motion information of the object throughout the N frames (S250). More specifically, linear regression fits are applied in x and y to the average motion blur locations for each frame duration that contributes to each motion blur result (over K frames), with w×w windows around (x,y) locations of each motion blur frame.

From the slope of the fits, $\rho_x$ and $\rho_y$, the direction of motion θ may be calculated as follows:

$$\rho_x(x,y,t) = \text{cov}(k,\overline{X_B}(k))/\text{var}(\overline{X_B}(k)) \quad (6)$$

$$\rho_y(x,y,t) = \text{cov}(k,\overline{Y_B}(k))/\text{var}(\overline{Y_B}(k)) \quad (7)$$

$$\theta(x,y,t) = \arctan(\rho_y/\rho_x) \quad (8)$$

In the above equations, the average motion blur locations at frame time t and for each frame delay $1 \leq k \leq K$ are found within w×w sized windows, $-w/2 \leq (i,j) \leq w/2$ as:

$$\overline{X_B}(k) = \sum_{i,j} (x+i)B_t(x+i, y+j, k)/w_k \quad (9)$$

$$\overline{Y_B}(k) = \sum_{i,j} (y+j)B_t(x+i, y+j, k)/w_k \quad (10)$$

The covariance between locations x and y, and average motion blur locations are respectively:

$$\text{cov}(k, \overline{X}_B(k)) = \sum_{k=1}^{K} k\overline{X}_B(k) - \frac{1}{K}\sum_{k=1}^{K} k \sum_{k=1}^{K} \overline{X}_B(k) \quad (11)$$

$$\text{cov}(k, \overline{Y}_B(k)) = \sum_{k=1}^{K} k\overline{Y}_B(k) - \frac{1}{K}\sum_{k=1}^{K} k \sum_{k=1}^{K} \overline{Y}_B(k) \quad (12)$$

The variance of the average motion blur locations are respectively:

$$\text{var}(\overline{X}_B(k)) = \sum_{k=1}^{K} \overline{X}_B^2(k) - \frac{1}{K}\left(\sum_{k=1}^{K} \overline{X}_B(k)\right)^2 \quad (13)$$

$$\text{var}(\overline{Y}_B(k)) = \sum_{k=1}^{K} \overline{Y}_B^2(k) - \frac{1}{K}\left(\sum_{k=1}^{K} \overline{Y}_B(k)\right)^2 \quad (14)$$

The regression fit of the motion blur images may allow the present embodiment to generate high-level motion features based on more frames than just two adjacent frames, although a two-frame embodiment may also be performed. Moreover, this fit may be performed on a large spatio-temporal cuboid (x,y,t) for the purpose of obtaining improved noise suppression due to the statistics of larger sample size.

Edge Texture Conversion.

The foregoing stage of the method may be modified or supplemented by generating textures from the spatial edges located in a video frame. An example applied to a hallway is described below.

Figure 4:
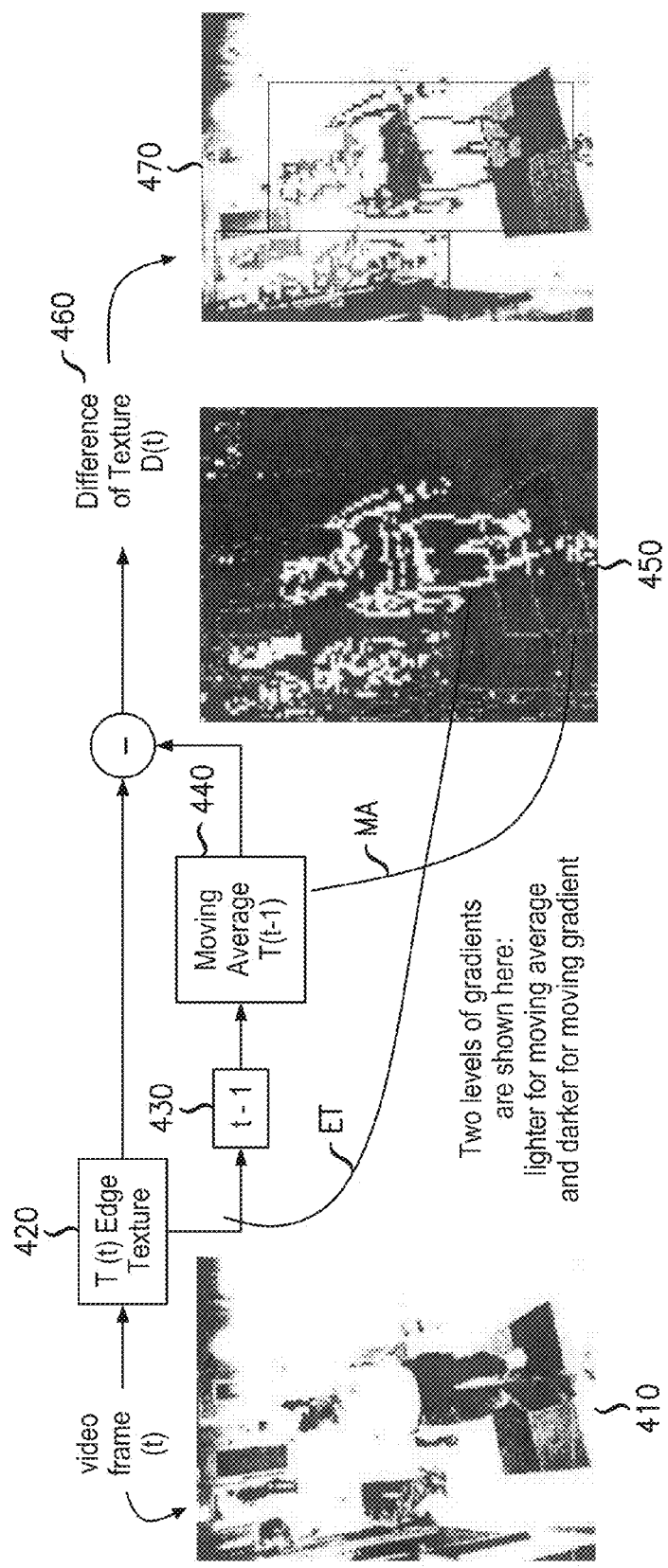
FIG. 4 shows operations included in one embodiment of a method for generating a difference-of-texture image for a video frame.

Referring to FIG. 4, a video frame 410 is received from a camera in the hallway. The video frame 410 has a plurality of spatial edges which move over time (frames). In this case, the spatial edges are associated with people walking in different directions in the hallway. The spatial edges in the video frame 410 may be described as edge textures T(t) 420, which move in different frames over time. The edge texture(s), or spatial edges, may therefore be said to have different spatial and temporal features.

The edge textures may be generated by converting the spatial edges into textures $C_M$ in accordance with the following equation:

$$C_M(x, y, t) = \sum_i \sum_j [\nabla E(x-i, y-j, t) = M] \quad (15)$$

where $w/2 \leq i$, $j \leq w/2$ and M={0, 1, 2}. In this equation, the difference in gradient edges may be summed over w×w windows.

Once the textures (spatial edges) in the frame have been located, a moving average is determined. The moving average may correspond, for example, to a background image derived from a difference of edge textures T(t) obtained at time t for video frame 410 and a previous frame 420 obtained at time t−1. For example, the background image may correspond to portions of the frame which do not move between times t−t and t. The background image may be considered to correspond to a moving average 430.

The edge textures T(t) and moving average (background image) may be expressed as gradients in a gradient image 450. In this gradient image, the edge textures T(t) are shown as light portions denoted by line ET corresponding to spatial edges at time t. The moving average is shown by darker portions of image 450 denoted by line MA.

Once the gradient image is generated, a difference is taken between edge textures T(t) and the moving average to produce a difference of textures D(t) 460. A difference image 470 corresponding to D(t) may correspond to the edge textures T(t) superimposed over the input video frame at time t. The edge textures may be shown in the difference image, for example, in a different color.

The difference in edge textures may be quantized, where a value of 0 indicates no texture, a value of 1 indicates a same texture relative to a prior frame, a value of 2 indicates a different or new texture, and a value of 3 indicates an undecided condition, for example, because of low confidence. The quantization of the difference in edge textures may be performed, for example, based on statistical averaging and confidences in accordance with the following equations:

$\nabla T(x,y,t)=0$, if $C_0(x,y,t) < w^2/T2$ $\nabla T(x,y,t)=1$, if $\nabla T(x,y,t) \neq 0$ and $C_1(x,y,t) > w^2/T3$ and $C_1(x,y,t) > 2C_2(x,y,t)$ $\nabla T(x,y,t)=2$, if $\nabla T(x,y,t) \neq 0$ and $C_2(x,y,t) > w^2/T3$ and $C_2(x,y,t) > 2C_1(x,y,t)$ $\nabla T(x,y,t)=3$ otherwise (16)

Scene Activity Vectors

Referring to FIG. 2, the second stage of the method includes generating scene activity vectors for the N frames based on the direction of motion information (S260). More specifically, once the motion direction information is determined at each location corresponding to the spatial edges, features are organized into a scene activity vector, SAV(t) for each frame.

Figure 5:
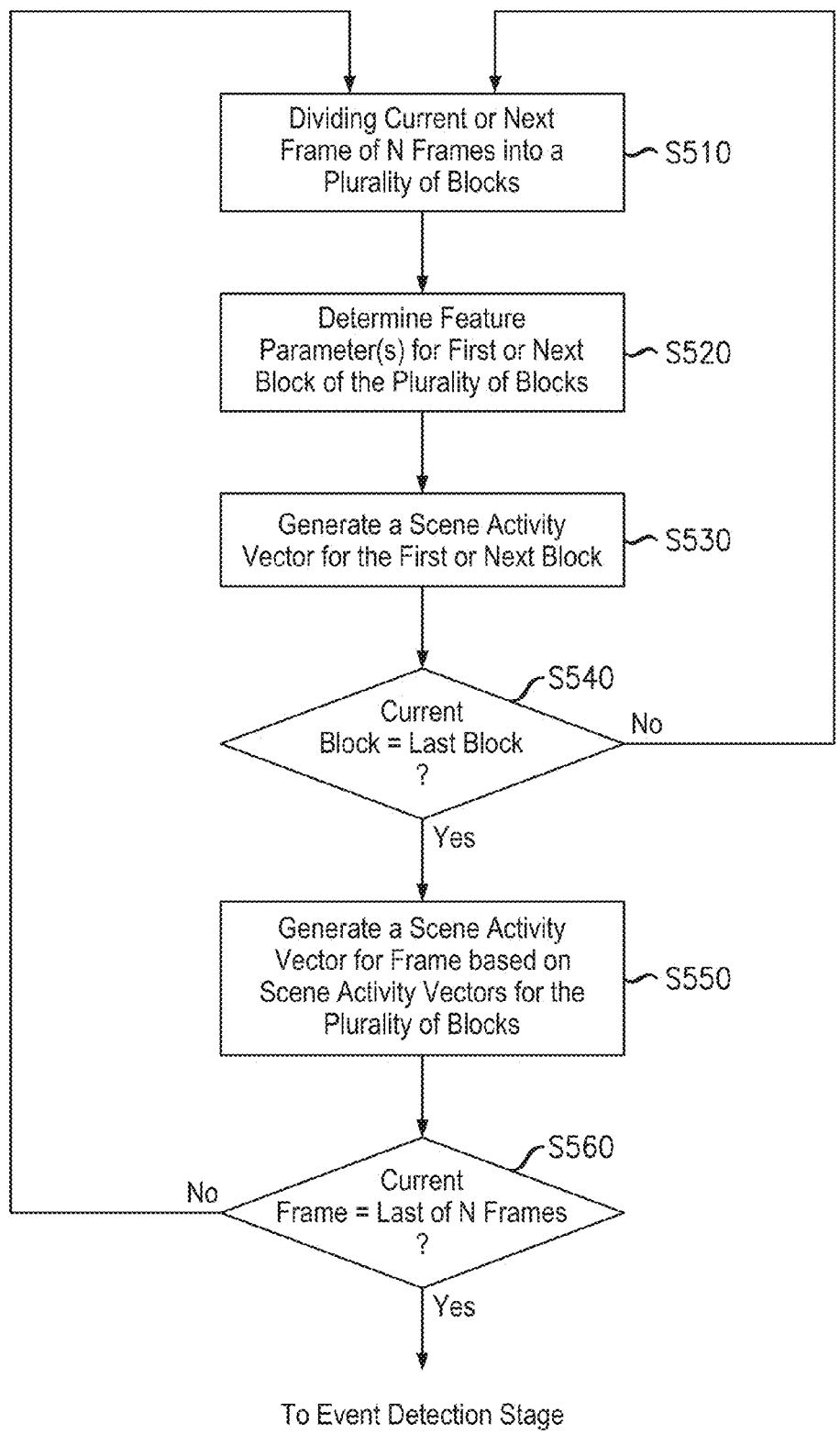
FIG. 5 shows operations included in one embodiment of a method for generating a scene activity vector for a video frame.

According to one embodiment, this is performed by a multi-level representation involving sequential 2×2 dividing of frames into blocks. Referring to FIG. 5, a first operation towards generating scene activity vectors includes dividing a first frame of the N frames into one or more blocks (S510). For example, at level 0, the whole frame may be considered a block. At level 1, the frame may be divided into 4 blocks. At level 2, the frame may be divided into 16 blocks, etc.

After the blocks have been divided, the method continues by determining a set of feature parameters for each of the blocks in the frame (S520). That is, each block is described by one or more feature parameters. The parameters may include one or more of a score, dominant direction, confidence, velocity, color, and density as well as other parameters identified below. (In one embodiment, all of these feature parameters are determined in operation S520 for each block in each of the N frames under consideration).

The score, s, is the sum of non-zero direction values in each block.

The dominant direction, d, is the circular average (over 0-2π radians) of all directions θi(x,y,t) in the block, where i=1, . . . n−1.

The confidence, $C_d$, is the inverse of the circular variance, with a 0-1 range and where:

$$\underline{d} = \arctan\left(\sum_i \sin(\theta_i) \Big/ \sum_i \cos(\theta_i)\right) \quad (17)$$

$$c_d = \frac{1}{n}\sqrt{\left(\sum_i \cos(\theta_i) \Big/ \sum_i \sin(\theta_i)\right)^2} \quad (18)$$

The velocity is a measure that is not directly obtained by previous methods using only adjacent frames, but can be obtained with reliability using a higher level approach support.

The color is the dominant color, where color is quantized into a number of colors. For example the number of colors may be the three colors: red, green, and blue. Or, the number of colors may be more than three colors. For example, in one embodiment, the number of colors may be the following ten colors: red, orange, yellow, green, cyan, blue, purple, black, grey, and white.

Additional parameters include density and frequency in time. Density is based on the percentage of pixels having motion per unit block area. Frequency in time is based on an inverse of the number of frames between an event at a current frame and a frame of a most recent previously detected event. The parameters may be used, for example, as motion features that describe the activity taking place in block regions in frames of a video clip.

In accordance with one embodiment, a confidence value may be provided for each of these parameters. The confidence value may provide a measure of uniformity or lack of variance of a corresponding parameter value. The confidence value may be based on the inverse of a statistical variance, which, in turn, may be scaled to a certain range, e.g., 0 to 1. For example, if a block region has only a single color value, then its variance may be 0 and its confidence may be 1. If a block has color quantization of 3 (RGB) and each color has equal weight, then the variance may be maximum and the confidence may be 0.

Based on these feature parameters, a scene activity vector F is generated for the block (S530). A determination is then made as to whether there are more blocks in the frame (S540). If so, the aforementioned operations are repeated until scene activity vectors are generated for all the blocks in the frame. The scene activity vector for block b on level m may be denoted Fmj(x, y, s, d, cd), where (x,y) is the location of the top left coordinate of the block. The scene activity vector (SAV) contains features for all blocks given as follows:

$$SAV(t) = [F_{bm}(x,y,s,\underline{d},c_d)] \quad (19)$$

where m=0, . . . , L levels and b=1, . . . $4^m$ per level (for non-overlapping blocks).

In a next operation, a scene activity vector is generated for the entire frame based on the scene activity vectors generated for the blocks in the frame (S550). A determination is then made as to whether additional frames are to be analyzed, e.g., whether the currently analyzed frame is the last frame to be analyzed (S560). If not operations S510 through S550 are repeated. If so, then the next stage of the method is performed which is event detection.

Before the event detection stage is performed, a number of examples of how the first and second stages may be performed for purposes of generating the direction and velocity parameters for a scene activity vector will be discussed.

In accordance with a first example, motion blur images may be determined by grouping together K different texture frames whose magnitudes are weighted by a time-decay factor, such that most recent features have highest values M(x,y). Here, M(x,y) represents a two-dimensional motion blur image.

After the motion blur images have been determined, a regression analysis is performed on them. The regression analysis may be a linear regression which involves fitting a plane to the motion blur images to determine the gradient of motion in accordance with the following equations:

$$\rho_x = Cov(x, M(x,y))/Var(x) \quad (20)$$

$$\rho_y = Cov(y, M(x,y))/Var(y) \quad (21)$$

After the linear regression is performed, motion flow parameters may be computed. As previously indicated, the motion follow parameters may include direction and velocity. The direction may correspond to the direction of slope of the planar fit performed by the linear regression analysis, and the velocity may be proportional to an inverse of the slope of the planar fit.

FIGS. 6A-6D show an example of the foregoing operations. In FIG. 6A, a man 610 included in a video frame is shown in conceptual form and a spatial edge 620 is shown to correspond to this man.

In FIG. 6B, this spatial edge is weighted by a plurality of time-delay factors illustratively shown as t, t−1, t−2, t−3, and t−4. In this example, the width of the spatial edge increases as the delay factor increases. The motion blur images are generated based on one or more of these time delay factors.

In FIG. 6C, a graph is shown plotting the values of the motion blur images M(x) in the x-direction as a result of the regression analysis. As shown, the regression analysis fits points corresponding to the time delays of the spatial edge to a common plane, or line in the case of a linear regression, with slope ρ.

In FIG. 6D, the direction parameter used in the scene activity vector corresponding to the spatial edge for the man is based on the slope of this line and the velocity parameter used in the scene activity vector corresponding to the spatial edge for the man is based on an inverse of the slope.

In accordance with a second example, two spatial edges 710 and 720 are assigned to a man 730 in a video as shown in FIG. 7A. The spatial edges 710 and 720 may correspond to leading and trailing edges respectively. Motion blur images for the spatial edges are then generated by grouping n different of texture frames, whose magnitudes are weighted by a time-delay factor such that most recent features have highest values M(x,y). Examples of the time-delay factors are shown in FIG. 7B and are used to generate corresponding points on motion blur images plotted for each of the two spatial edges.

A regression analysis is performed to fit the points to a plane, or line, having a slope. Line 740 may correspond to this regression analysis. For example, the slope of M(x) in FIG. 7C corresponds to the linear regression fit to the motion blur values, M(x).

In FIG. 7D, the linear regression fit is performed not on the motion blur values themselves, but on first moments of the motion blur values, where the first moment values are calculated for each motion blur duration, or decay. The lower line corresponds to the regression fit to the motion blur values, M(x). In this example, there are 2 motion blur values for each delay. The upper line corresponds to the regression fit to the first moment of each delay of motion blur values, so the first point is the first moment of the two points on the lower plot and the second point is the first moment of the next two points on the lower plot, and so on.

In FIGS. 7C and 7D, the vertical axis corresponds to motion blur values for motion blur images/frames for M(x,y). However, to simplify illustration of the plots, the vertical axis has been labeled M(x). In this regard, the x and y dimensions are separable and explanation of y follows x. $\overline{M}$ corresponds to the first moment of the motion blur values, where averages of their values are taken for each frame delay and for each x,y location.

Direction and velocity parameters may be generated based on the curves shown in M(x) and $\overline{M}$. In accordance with one embodiment, these parameters are determined based on the ratios of covariance and variance given in Equations (20) and (21) for x and y and based on the direction and velocity as determined by the following equations:

$$\text{Direction: } \theta = a\tan(\rho_x/\rho_y) \quad (22)$$

$$\text{Velocity: } v \sim 1/(\rho_x^2 + \rho_y^2)^{1/2} \text{ where } \sim \text{ indicates a proportional relationship} \quad (23)$$

Event Detection

Referring again to FIG. 2, the third stage of the method includes detecting an event in the visual information based on the scene activity vectors generated for the N frames. (Block S270). The event may be an activity, condition, or status of content in the visual information. For example, the event may correspond to the occurrence of absence of the object of interest or a particular movement or type of motion of that object. The event may also correspond to any of the types as otherwise discussed herein.

In accordance with one embodiment, an event may be a contiguous sequence of frames with substantial scene motion, and its onset and ending may be measured from or otherwise based on the score of one or more of the scene activity vectors SAV(t) (denoted |SAV(t)|) generated during the second stage of the method.

In the exemplary case where each frame is considered a block (e.g., in the level 0 block case), the onset and ending of an event may be extracted or otherwise determined based on a statistical change detection technique. One example of this technique is referred to as the cumulative sum (CUSUM) technique which may be implemented by generating a control chart.

More specifically, the CUSUM technique is implemented to detect a sequential accumulation of evidences of changes in a univariate time series, and signals the onset of an event when accumulated evidences exceed a threshold. Minor fluctuations and accidental spikes are suppressed or otherwise disregarded as noise, in order to allow for detection of events defined by substantial scene activities. Similarly, the termination of an event is detected by a sequential accumulation of evidences of no changes or ones that fall below the threshold, at least for a predetermined time period. A specific implementation of the CUSUM technique will now be discussed.

According to the implementation, a threshold 6 is set for event detection. The threshold may be set based, for example, or prior training sessions which correspond to the generation of scene activity vectors corresponding to types of events to be detected. For example, the gathering of a crowd of a certain size may correspond to a certain level of a scene activity vector or the movement of one or more people may correspond to a certain level of a scene activity vector. The threshold 6 may be set to a range below these SAV values but above SAV values considered to be non-interesting events (e.g., no movement of a person or object, the gathering of just a couple of people not considered to be a crowd, etc.).

The SAV values generated for the frames of a video may be monitored and compared against the threshold to detect the onset (beginning) and/or ending (terminal) of an event. Additionally, or alternatively, a change in SAV values may be monitored and compared to the threshold. For example, difference values of |SAV(t)|, denoted Δ, may be determined for a series of frames and the difference values may then be compared to the threshold δ. In this case, the threshold is set to so that a change in SAV values over a certain amount triggers the detection of an event, e.g., may substantial increase or decrease of activities between consecutive frames.

If the difference is smaller than the threshold, the scene is considered to be unchanged. Additionally, a probability may be assigned for the difference crossing the threshold, on the condition that the frames have an ongoing event or that there is no event. An example assignment is as follows:

$$p_1 = \text{Prob}(|\Delta| \geq \delta | \text{ in event}) = p_{IN} \quad (24)$$

$$p_2 = \text{Prob}(|\Delta| < \delta | \text{ in event}) = 1 - p_{IN} \quad (25)$$

$$p_3 = \text{Prob}(|\Delta| \delta | \text{ not in event}) = 1 - p_{OUT} \quad (26)$$

$$p_4 = \text{Prob}(|\Delta| < \delta | \text{ not in event}) = p_{OUT} \quad (27)$$

The probabilities $p_{IN}$ and $P_{OUT}$ may be estimated, for example, from a training sequence. In one embodiment, we start with a value of 0.7 for both before we obtain a labeled sequence, and seek to estimate this from data after sufficient labeled sequences are collected. Also, two CUSUM charts S and E may be used to detect the start and end points of an event. The method may alternate computation between the two charts, starting by turning on chart S with initial S=0 and turning off chart E, and then iterating for each time step I as follows.

First, compute a log-likelihood ratio statistic Li as a function of difference Δi:

$$L_i = \log(p_1/p_3), \text{ if } |\Delta_i| \geq \delta \quad (28)$$

$$L_i = \log(p_2/p_4), \text{ if } |\Delta_i| < \delta \quad (29)$$

Second, if chart S is on, compute the cumulative sum for the starting point, Si=max (Si−1+Li, 0). If Si exceeds threshold Hstart, find the previous closest point tstart such that Si=0 and mark that as the event beginning. Proceed to find the event end by turning off S, turning on E, and initializing Ei to 0.

Third, if chart E is on, compute the cumulative sum for the ending point, Ei=max (Ei−1−Li, 0). If Ei exceeds a threshold Hend, find the previous closest point tend such that Ei=0, and mark this as event end. Continue to look for the next starting point by turning off chart E, turning on chart S, and initializing Si to 0.

Essentially, the algorithm underlying this stage of the method looks for the point when the joint likelihood of sequential steps accumulates to provide sufficient evidence that an event is occurring, and backtracks to find the starting point of this accumulation. Likewise, it accumulates the sequential joint likelihood to the point that signifies the event to be no longer present, and backtracks to find the ending point. Some fine adjustment on the sensitivity of detection is possible by tuning the parameters δ, pin, pout using a collection of labeled events.

Figure 8:
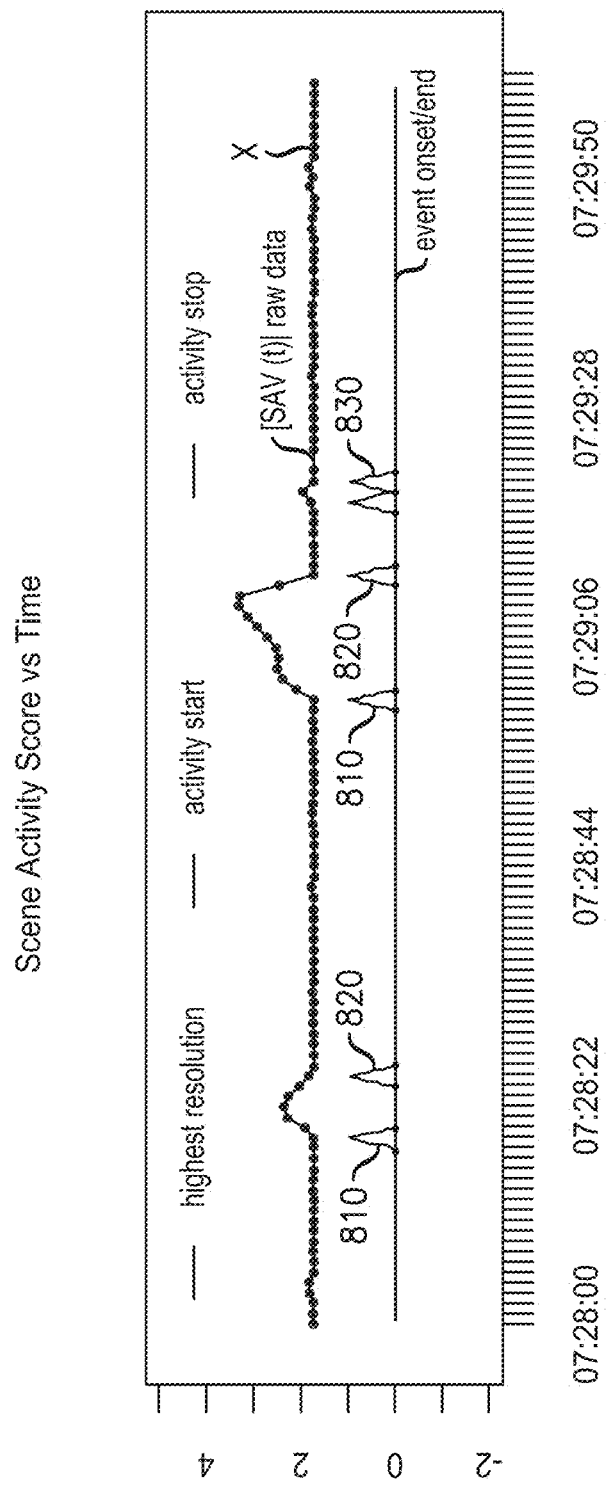
FIG. 8 shows an example of how an event may be detected based on scene activity vectors generated for frames of video over a period of time.

FIG. 8 shows an example of event detection performed according to this algorithm. In this figure, line X is generated based on the SAV values (or a change or difference of SAV values) generated for video frames in the time period shown. More specifically, this line X corresponds to the log values generated for the SAV values as described above and the threshold for detecting an event may be set to a value of two, e.g., δ=2.

When line X exceeds the threshold, the beginning of an event is detected as shown by markers 810. When line X drops below the threshold, the termination of the event is detected as shown by markers 820. Smaller disturbances (denoted, for example, by markers 830) are disregarded as noise, as line X does not exceed the threshold value for these disturbances.

In the aforementioned approach, an event is detected based probabilities and a threshold. The threshold is assigned to a value that attempts to eliminate the false detection of an event. Preventing the false detection of an event may be enhanced by not only detecting when a magnitude of line X exceeds the threshold but also by requiring line X to exceed the threshold for some minimum period of time. This additional requirement would eliminate sudden spikes in line X than may be caused by noise or some other anomalous occurrence.

The events detected can be of variable lengths. Additionally, or alternatively, the |SAV(t)| values corresponding to each event may be of certain shapes that depend on both the camera's setup (viewing angle) and the patterns of activities in the scene (e.g. possible traffic flows in a traffic monitoring application). With suitable normalization, the profile shapes can be compared using a standard similarity measure. A clustering procedure can then uncover the typical patterns and anomalies from an archive of such events.

The foregoing method and apparatus embodiments may be used in various applications for event detection, examples of which will now be discussed. A first application involves the motion of people in three contexts: 1) one or a few people in a lowly lighted hallway, 2) ten people moving in an outside environment, and 3) a crowd of people on a subway platform. The datasets generated in each case illustrates how different features parameters are different for different events and crowd sizes.

Event Detection

Motion of One Person in Hallway

In this application of the method, scene activity vectors (SAV) are generated for motion edges over K frames of video taken by a camera positioned in a hallway of a building. The SAVs are generated from spatio-temporal gradient images which are fitted and averaged, thereby reducing noise.

Figure 9:
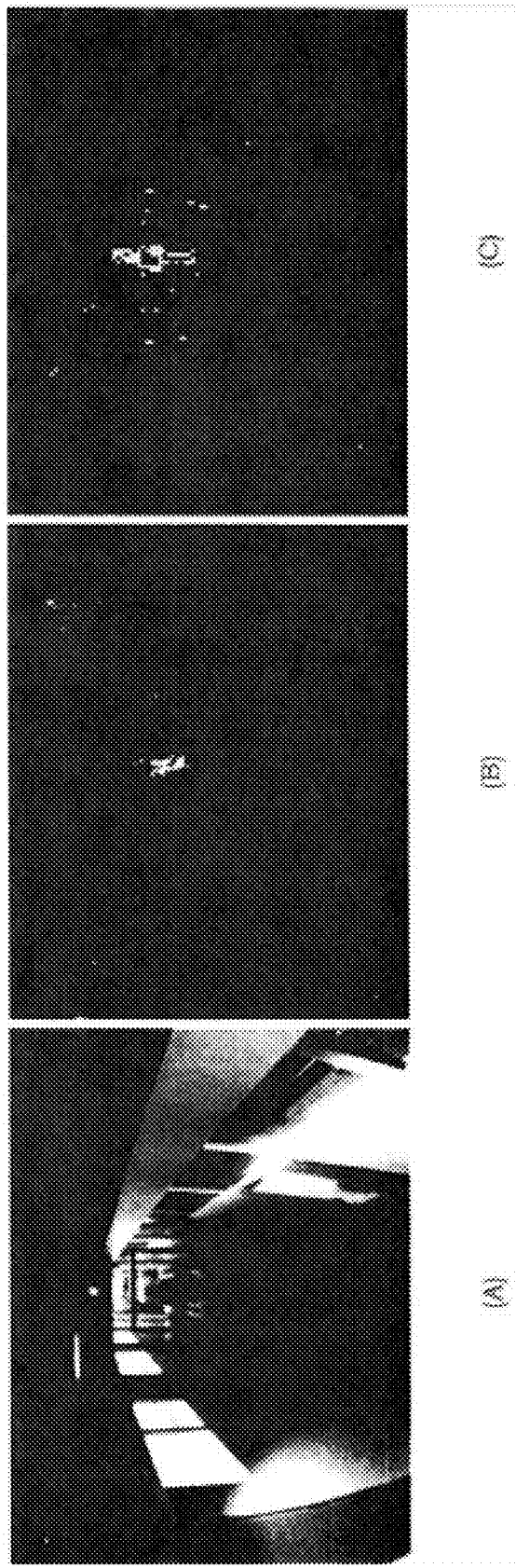
FIG. 9A shows a video frame of a hallway scene.
FIG. 9B shows an example of motion features generated for the video frame of FIG. 9A using an optical flow technique.
FIG. 9C shows an example of motion features generated based on location of spatial images in the video frame of FIG. 9A.

FIG. 9A shows a frame of the video containing an object of interest in the form of a person walking down a hallway under low lighting conditions.

FIG. 9B shows the generation of motion features using a different technique, in this case an optical flow technique performed on the video frame of FIG. 9A. The optical flow technique finds motion correspondence between pixels on two consecutive frames with assumptions of constant illumination and small object movement. In FIG. 9B, a 5×5 grid size was used to find motion.

FIG. 9C shows motion feature activity generated for the video frame in FIG. 9A in accordance with an example of the present embodiment. In implementing this embodiment, scene activity vector (SAV) are generated to fit motion edges over K frame. In the frame of FIG. 9A, there is far less activity in non-motion areas for SAV at scale level 5.

As shown by comparison to FIG. 9B, motion features found based on the generation of spatio-temporal gradients greatly reduces noise and produces motion edges that provide a more accurate representation of motion of the person walking down in the hall in the frame. Also, the present embodiment used about 45 msec per frame versus the optical flow technique in FIG. 9B implemented in OpenCV requiring 90 msec, twice as long as the present embodiment.

Event Detection

Motion of People in Hallway

Figure 10B:
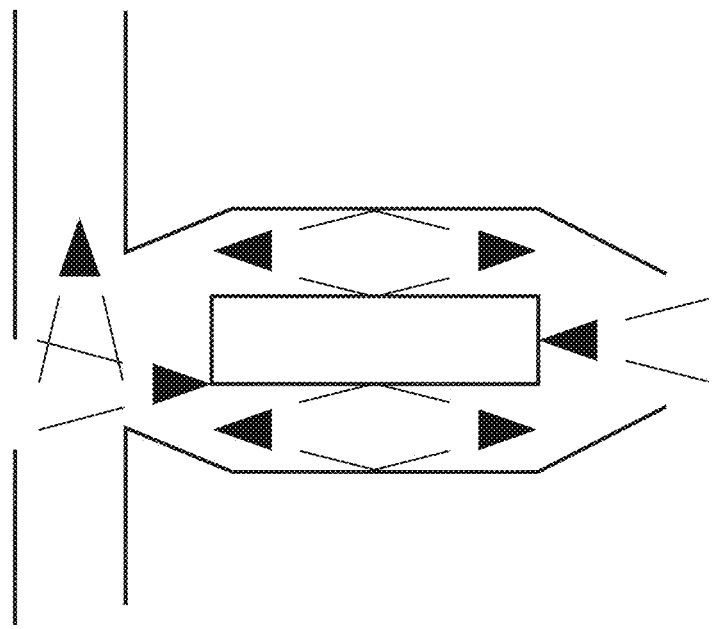
FIG. 10B shows a layout of the hallway and a camera position.
Figure 10A:
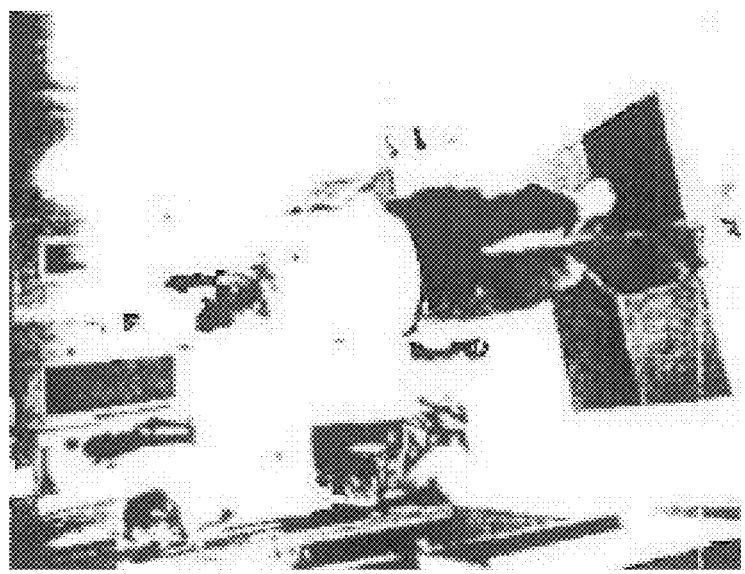
FIG. 10A shows a video frame of a hallway with multiple people for which spatial edges are to be generated.

In this application, the method is applied to detect motion in a video of multiple people walking through a network of interconnected and/or intersecting hallways. FIG. 10A shows a video frame taken by a camera and 10B shows a layout of the hallways where the triangles correspond to different types of motion (e.g., events) that may be detected. The motions which can be detected over a plurality of video frames include, for example, walking toward a camera, stopping in the hallway, taking a left turn, taking a right turn, a person walking away, and a person loitering in one of the hallways.

In this application, the method was applied as follows. First, scene activity vectors SAV(t) were calculated as previously described. Events were then detected based on CUSUM-based statistical change detection. FIG. 10A shows an example of the SAV(t) values generated for the man in the foreground of FIG. 10A walking towards the camera.

After the event is detected, the method may include a number of additional steps including classification of the detected event. In accordance with one embodiment, event classification may be performed by performing k-means clustering and then anomaly detection.

The k-means clustering step may be performed by comparing temporal profiles as follows. First, temporal profiles are scaled to the same height based on peak score during each event. Second, the height-normalized profiles are interpolated using a cubic spline and re-sampled to 100 time steps. The profiles, now normalized in duration and peak score, are then sent to an agglomerative clustering procedure (with complete linkage) using Euclidean distance. The resulting dendrogram is cut at a chosen height to obtain partitional clusters that represent commonly occurring patterns. Profiles with a large distance to their respective cluster centroids are identified as anomalies.

Figure 11B:
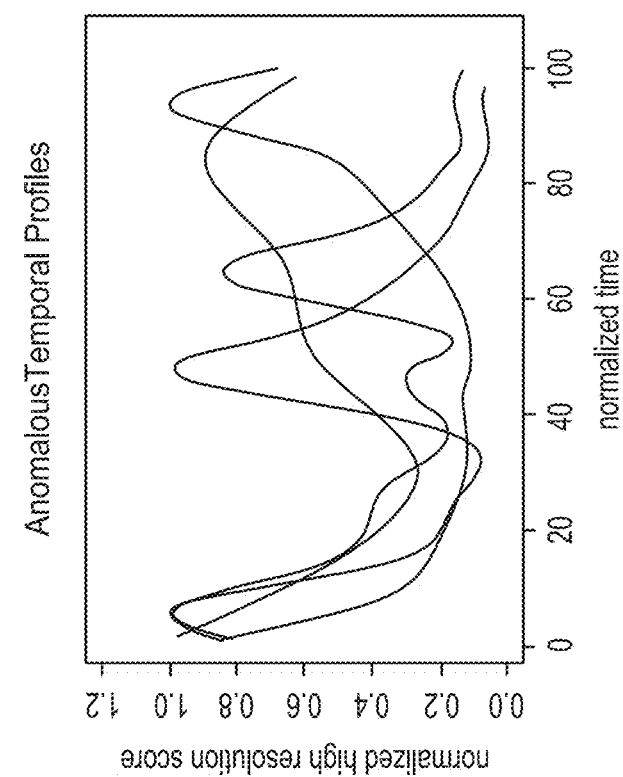
FIGS. 11A and 11B show temporal profiles for event detection.
Figure 11A:
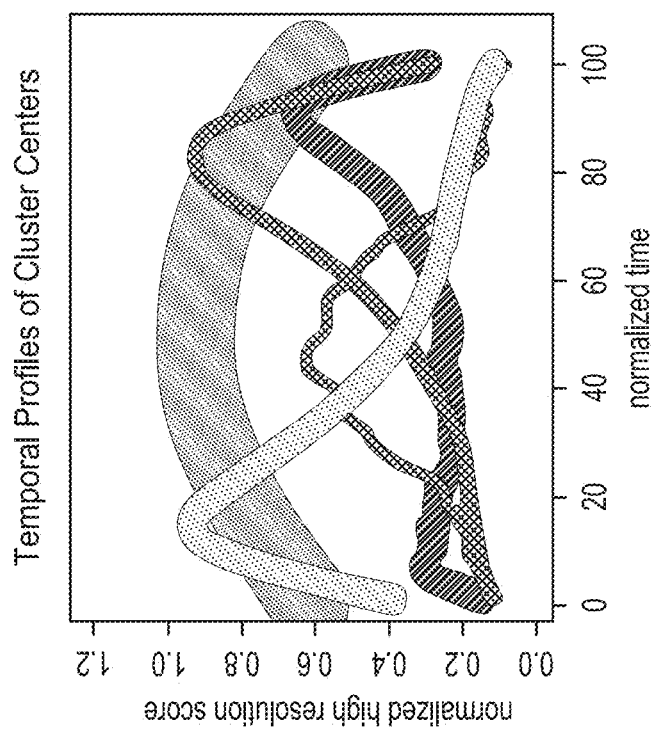

FIG. 11A shows examples of the temporal profiles of cluster centers generated according to this step. The temporal profiles have three major shapes. The first shape is a skewed-left shape (A1) which represents motion of one or more persons entering close to the camera view and then walking away from it. As a result, the motion region reduces over time (frames).

The second shape is a skewed-right shape (A2) which represents one or more persons entering the camera view from afar and walking toward the camera. As a result, the motion region increases in size over time (frames).

The third shape is a symmetric shape (A3) which represents a person walking across and perpendicular to the camera. As a result, the SAV score is roughly constant or within a relatively narrow range, e.g., lies in a narrow range of normalized high resolution scores.

FIG. 11B shows an example of the curves generated for the anomaly detection phase. Each of these curves is a trajectory of motion activity as measured by the SAV. FIG. 11A shows five trajectory shapes that are most common as determined by statistical clustering. The curves in FIG. 11B are trajectories that were not close (at least to within a given tolerance) to any of the major trajectory clusters. FIG. 11B, therefore, shows that these trajectories occur less frequently, and therefore may be considered anomalous. More specifically, anomalous trajectories may be detected based on their distances from the cluster centers, where a distance above a threshold indicates that a trajectory does not belong to that cluster.

Event Detection

Emergency Event

Figure 12:
FIG. 12 shows a video frame of a crowd during an emergency.

In this application, the method is applied to detecting an emergency in an outdoor campus area, based on the motion of a crowd in that area. At the beginning of the video, people walk randomly within camera view until a (simulated) emergency occurs. At this point, the video shows the crowd of people fleeing in a unidirectional motion (as shown by the arrow superimposed on this video frame). FIG. 12 shows a video frame during this point in time. (The method may also be implemented to detect an emergency based on a sudden movement of a crowd in multiple directions).

Unlike the hallway examples, the SAV score profile may not be useful for classification for all types of event detection. More specifically, unlike the hallway motion detection examples, the video in the present case generally has the same steep onset slope when people initially react to the emergency. For example, a flat plateau is generated as the people flee and steep end slope is generated as the people exit from camera view. However, in this application, event detection and/or classification may be performed based on exit direction(s) of the people in the video.

Figure 13:
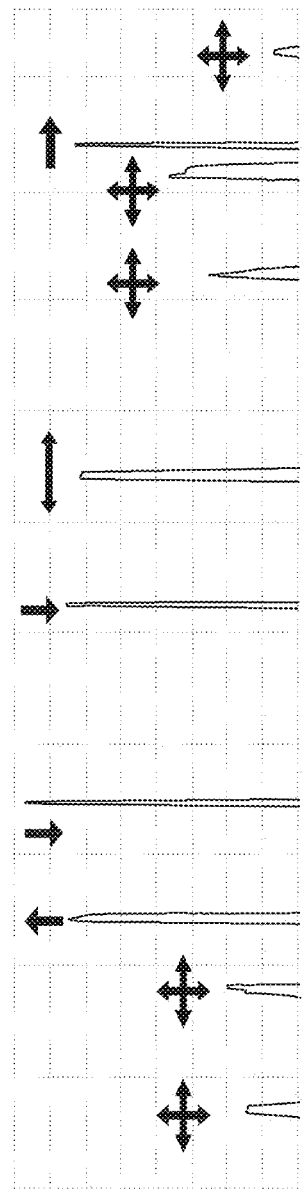
FIG. 13 shows confidence values for the video frame of FIG. 12.

FIG. 13 shows SAV confidence values cd (0-1.0 on the y-axis) for 10 events (over 4 min. 17 sec on the x-axis). Dominant direction d is shown symbolically above events whose confidence is greater than an empirically chosen threshold. In FIG. 13, the dominant directions are shown by up, down, left or right arrows above the peaks and a low-confidence is shown by the crossed arrows. Based on these parameters, homogeneous and heterogeneous motion events may be detected and distinguished from one another, with homogeneous events can be classified by their direction-filtered SAV.

Figure 14A:
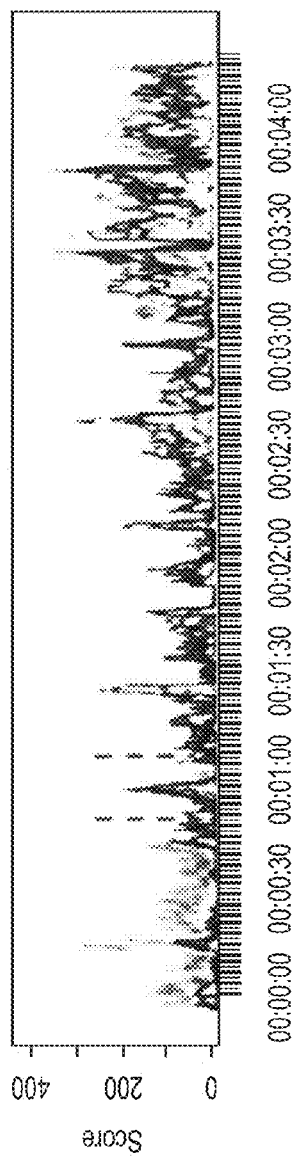
FIG. 14A shows examples of scores generated for a video frame.
Figure 14B:
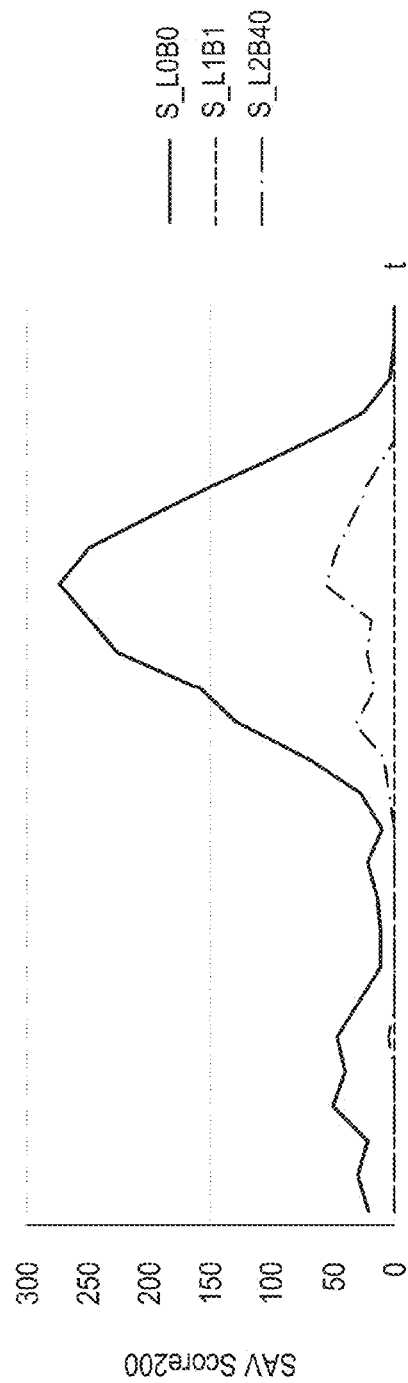
FIG. 14B shows a scene activity vector score for the video frame.

A more precise (finer-grain) classification can be performed using the SAV score profiles in different spatial blocks at different scale levels. The plots in FIG. 14A show that activity is different by location and scale level. More specifically, the Scene Activity Score vs. Time plot has curves showing activity in different blocks or locations in the video frames taken from time 0 seconds to approximately 4 minutes. These plots may be considered level 1 plots. The plots B1, B2, and B3 in FIG. 14B show the SAV scores for an event corresponding to the peak shown between the dotted lines in FIG. 14A at different levels (e.g., 0-2) and blocks 0, 1, and 40 respectively.

Event Detection

Motion of Crowd on Subway Platform

In this application, the method is applied to detection of the existence and/or movement of a crowd on a subway platform. The video during this application corresponds to five 15-minute video clips which record passengers waiting, entering, and exiting trains. Because the subway station is always crowded when the train arrives, SAV score peaks are generated with the corresponding crowd motion.

Figures 15, 16:
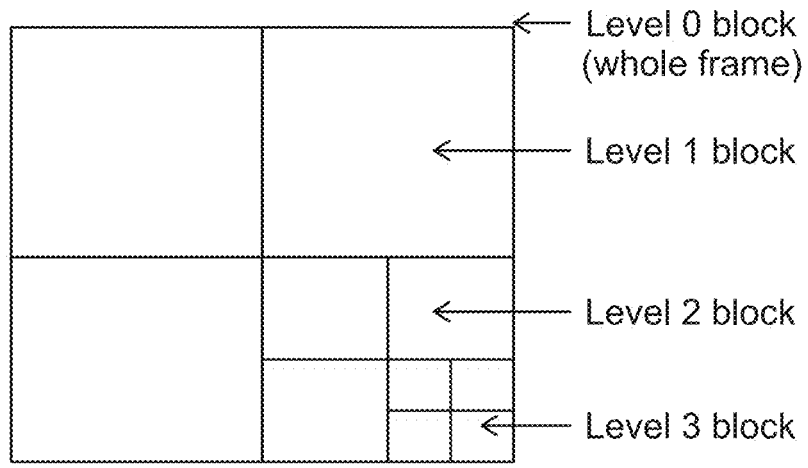
FIG. 15 shows examples of different levels of division of a frame.
FIG. 16 shows parameters of the divided levels of FIG. 15.

After the spatial edges are detected and corresponding gradient images generated, each frame may be divided into blocks of different levels as previously described. As shown in FIG. 15, level 0 corresponds to the entire frame, level 1 corresponds to 4 blocks, level 2, corresponds to 16 blocks, and level 3 corresponds to 64 blocks. The decision as to which level to use is made by using the confidence values generated for the parameters, where a high confidence value (e.g., one above a reference value) indicates that a block on that level has good uniformity of the parameter value and can be used with confidence. If the confidence value of a parameter value is not high (e.g., below a reference value) at a particular level, then the analysis looks to the next level (smaller block size) until a level has blocks with a confidence value above the reference value or a chosen threshold.

Once the level is selected, the number of motion features in each block is determined. FIG. 16 shows examples of the maximum number of motion features that may be generated for the divided blocks on a level-by-level basis. For example, for a 512×512 image size and 4 levels of side lengths of 128, 64, 32, and 16, then L1=2, L2=5, and the SAV feature length is 300×4=12,240 (which is about 5% of the full 262,000 pixel image). FIG. 15 shows SAV as a multi-scale vector of features.

FIG. 17 shows an example of how motion features filtering of the scene activity vectors may be performed for the crowded subway platform case. After the scene activity vectors SAV(t) have been generated over time, these vectors may be filtered based on one or more motion features (e.g., direction, speed, color, etc.). For example, filtering may be formed to select the SAV vectors having a northeast direction with slow speed and a dominant color of red or blue.

Figure 18:
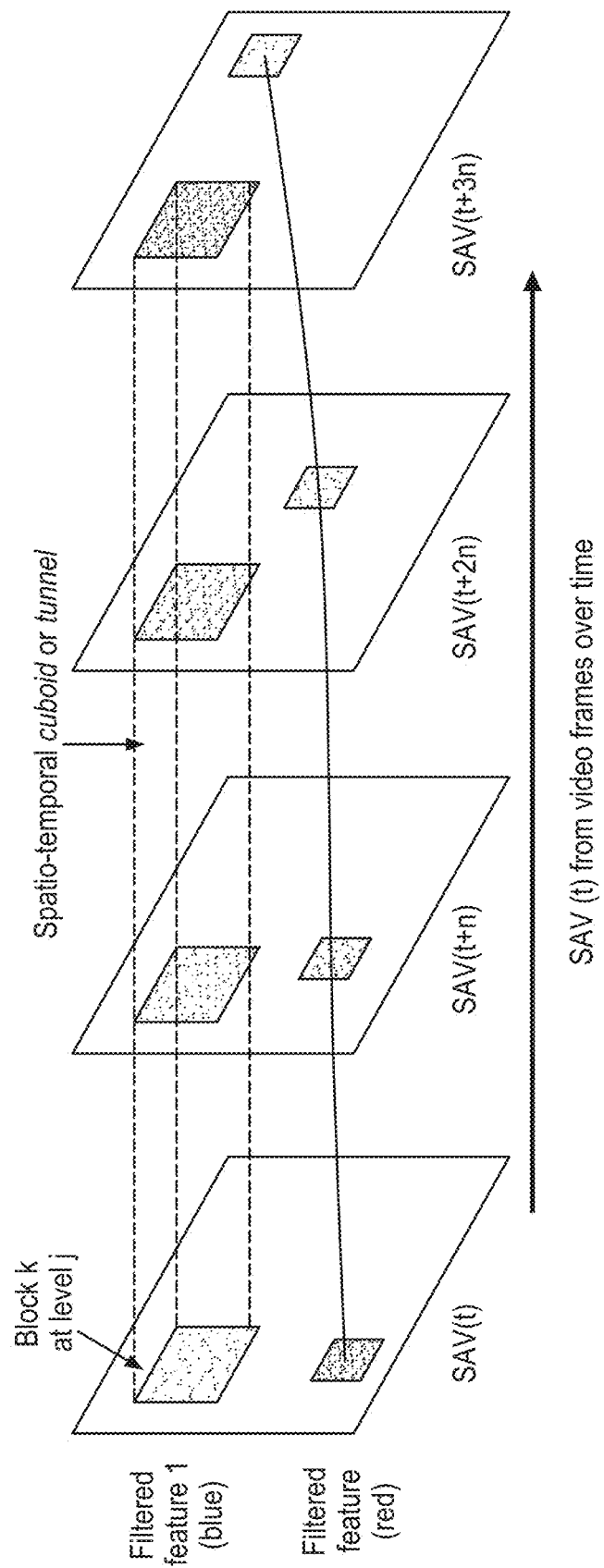
FIG. 18 shows an example of a spatio-temporal cuboid generated for detection of an event in a plurality of video frames.

As shown in FIG. 18, in frame t, two blocks are filtered. The first block corresponds to a color of blue and the second a color of red. This filtering is performed by locating blocks in the frame that have a high confidence of the filtered feature, in this case red or blue. These blocks are then tracked through time (subsequent frames) SAV(t), SAV(t+n), SAV(t+2n), SAV(t+3n), etc., through a spatio-temporal cuboid or tunnel. The onset and endset points may then be determined based on these filtered features The endset points occur when the feature to be filtered no longer appears in the spatio-temporal tunnel with high confidence and/or when the tunnel ends.

Figure 19:
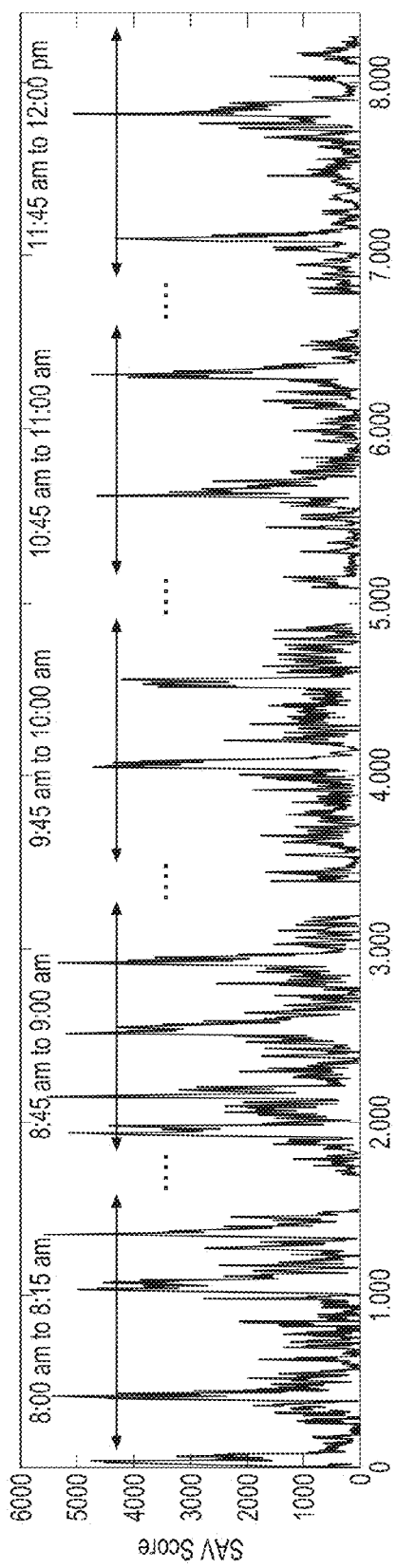
FIG. 19 shows scene activity vector scores at different times.

FIG. 19 shows the SAV score plots at different time periods of a morning-time station, each peak indicates train arrival. All peak shapes are similar because activity is similar. However, the duration of the peak, or exit time, indicates crowd density and peak periodicity gives train frequency. For instance, periodicity is 4 minutes between 8:00 and 9:00 AM, and lengthens to 8 minutes from 10:45 to noon.

Additional applications involve the use of one or more video cameras placed at various locations may be used to provide assistance to people for various purposes. The video cameras may be public cameras located in subway platforms, traffic cameras, mall cameras, airports and other types of transportation terminals, sporting venues, advertising displays, areas requiring security or surveillance, college campuses, parking lots, or cameras located at other public places. The video cameras may also be privately located or combined in a network with public cameras in accordance with the purposes stated herein In accordance with one embodiment, event detection is performed based on video provided by one or more cameras, or a network of cameras, that may be public cameras, private cameras, or a combination of public and private cameras. Event detection may be performed in accordance with any of the aforementioned embodiments and may be combined with additional features to provide a more complete approach to public safety and/or communication with the public One implementation involves performing event detection for the purpose of public safety monitoring. The event detection is performed in accordance with any of the aforementioned embodiments and also includes monitoring (or tracking) motion associated with the spatial edges for one or more objects of interest throughout the frames of the received video.

Other applications involve providing public safety help and information. Current surveillance systems fail to provide its subjects with any way of knowing if they are being seen by authorities. This may be problematic in an emergency or otherwise when the subjects are in distress. The following embodiments allow the subject(s) of the camera(s) to interact with camera authorities Public Picture Phone.

In this application, the aforementioned methods for detecting an event is applied to allow interaction with the public in the viewing area of one or more network cameras. The events to be detected include a various types of gestures made by a person in distress. These gestures include rapid waving of hands, jumping around, head gestures formed by screaming, and falling down to the ground as well as other bodily motions.

When such an event is detected, the camera may be equipped within one or more devices for communicating with the subject that needs assistance. The devices include various types of audio and/or visual alarms or indicators and/or a two-way speaker system or a video monitor allowing for bidirectional communications between the person and an official. The method may further include an alarm or other warning message used to alert an official that an event has been detected. This is especially useful, for example, in a command center where scores or even hundreds of public cameras are to be monitored. When alerted, the official may respond by sending a signal to activate any of the aforementioned types of alarms or the speaker system.

In accordance with one variation, a person may stand in a specific location within the field of view of the camera. The location may be marked in a conspicuous manner so as to be easily seen by the public. The method may detect an event as the presence of a person at the specific location. Such a location may be marked, for example, by a painted circle on the ground. The detection of a person at this location may be interpreted by an official or a computer monitoring program at the control center as a call for attention.

For example, an official may answer the call by appearing on the public display associated with the camera. This shows that the call is acknowledged, there is a person on the other end, and this official sees both the person making the call and his or her surroundings. A variant of this can be accomplished with a campus- or city-specific application loaded on a GPS-enabled smart phone. When the application is invoked, location and cell phone number are transmitted to the authorities to enable a voice or video connection in which the official can hear or see the person via the phone plus see the wider area of the person through the public camera.

Public Activity Barometer.

As previously discussed, at least one of the aforementioned method embodiments may be applied to measure trends of activity against a benchmark. The benchmark may be considered normal activity and deviations from the benchmark may be detected as an event. When applied to public safety, detection of these events are of even greater interest.

More specifically, the aforementioned method embodiments may be applied to serve as an activity barometer to the public, to show how activity at a camera location compares to normal activity (e.g., benchmark) at that time.

Figure 20:
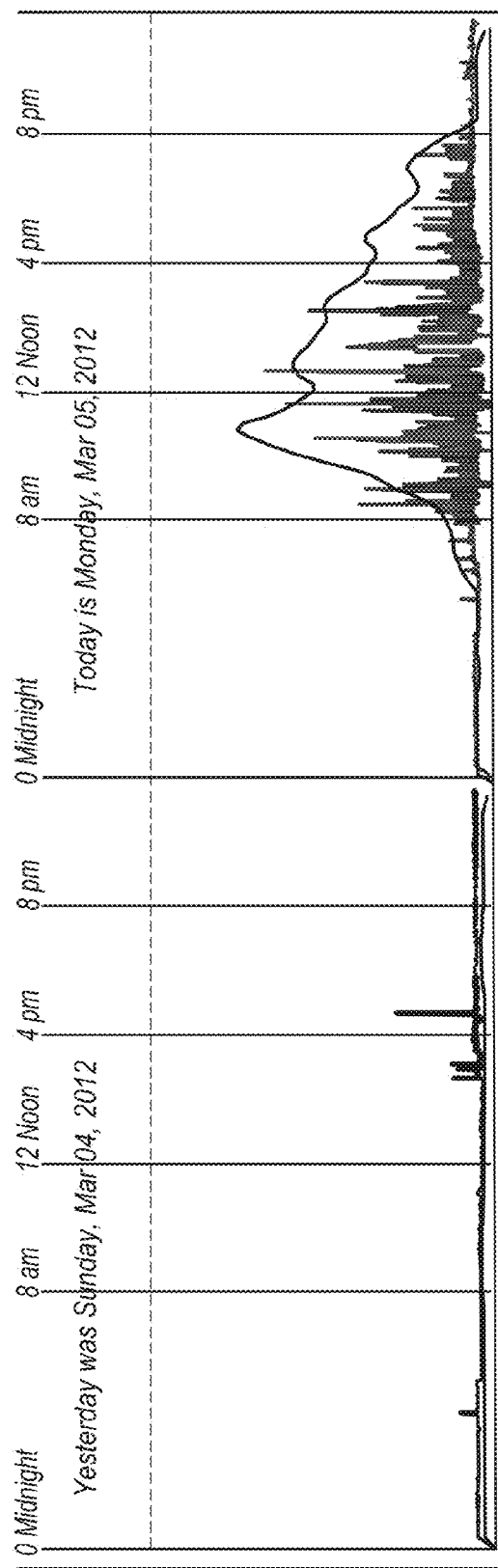
FIG. 20 shows scene activity vector values at different days.

FIG. 20 plot scene activity vectors generated from video taken over two days in a workplace. The first day is a Sunday (as labeled) in which the trend plot (statistics over many months of data) shows very little activity More specifically, the SAV plot for Sunday shows three spikes corresponding to three detected events. The first event was detected early Sunday morning and two additional events were detected in mid-afternoon.

In contrast, in the Monday plot, the trend line shows a multitude of spikes during work hours, with event detection peaking around lunch and then waning activity through the afternoon. The current activity plot shows 5 to 7 spikes corresponding to "above trend" events during this day.

The activity barometer of this embodiment may therefore be used, for example, to monitor detection of events that threaten public safety (e.g., crime) on the streets of a city at times when event detection on the SAV plot has low activity, signifying that work hours are over during the time when the potential for crime becomes more probable.

Additionally, such an activity barometer might be used to notify the public of a safer time to visit a park, gym, or pool, or might be used to identify when activity is beginning to rise to best time joining a lineup for a show. Also, such a barometer may provide information on traffic congestion or the lack thereof, which may be relied on to help plan trips through a city area.

Around the Corner.

The aforementioned method embodiments for detecting events may be implemented on notebook or personal computer or as an application on a smart phone, pod- or pad-type device (e.g., a user device or terminal). For example, one embodiment may be based on video on a user device or terminal, for example, through the Internet.

The video may derive from one or more public or private cameras located. For instance, a smart phone application may enable a driver to see video for an upcoming intersection. In this embodiment, the method may be implemented in an application that enables a city pedestrian to see views of a number of cameras along an intended path, or which enables a person to see both a close-up view from the nearest camera plus a wider bird's eye view of the same area to ascertain context, trends, or conditions of activities or events. If unusual activity is occurring in that video view, this may be indicated, for example, by a red flashing frame around the video or some other warning. People can choose their subsequent path knowledgably.

Gaming Application.

The event detection embodiments may also be applied in the formation of a game. The game may be implemented, for example, to make the public aware that cameras placed in various public places now are capable of operating in additional or different mode, namely an interactive mode.

One type of game may be formulated to have the following specifications. First, the game may use the aforementioned event detection embodiments to recognize patterns, events, or activities and then compare them to video analysis results (e.g., SAV patterns) already computed for public safety monitoring. For example, video taken from previous events may be used as reference SAV values for the purpose of allowing for pattern recognition.

Second, the game may take into consideration varying environmental or other public space conditions. Examples include variable natural lighting, weather conditions, and other effects which might produce a false positive in terms of event or pattern detection. The game may also take into consideration video of large spaces without well-defined boundaries, which, for example, may encompass areas that include people who are not playing or who are otherwise not partici-pants in the game. The software implementing the gaming method may be written to compensate for these contingencies.

Third, the game may be implemented to engage passers-by as well as active players. For example, the various camera locations may be equipped with bidirectional communication equipment, monitors, speakers, and/or other warning or communication devices that may be used to elicit, invite, or otherwise involve people to play the game.

Fourth, the game may implemented in real-time and therefore may be suitable for use, for example, at an amusement park or other entertainment facility.

Fifth, the game may be implemented to safeguard the identity of people playing the game and/or who are not playing the game but who are in the field of view of the camera(s) taking the video. This may be accomplished, for example, by blurring or otherwise obscuring (e.g., using avatars, icons or other graphics) the faces and/or bodies of the people and/or identification information such as license plates.

A game known as Brooklyn Blooms was recently developed to have the aforementioned features. In this game, images of people in the video are replaced with graphical objects in the form of flowers. The flowers grow at locations of motion and grow more quickly and densely with more activity.

In default mode, a passer-by might look up to see a display showing flowers growing whimsically on the public space he is walking through. With more attention, he might discover that the flowers are growing along her own path and at other locations of moving people. He can continue on or stop to engage with the game more actively. He plays the game by creating as much motion as possible in an attempt to fill the space with flowers. More players will fill the screen faster. When he—and/or the group—succeeds in creating a sufficiently large and beautiful garden, the game stops and displays the game time plus a video reward.

The space of flowers of flowers may then be cleared to ready for the next "plantings." The following chart shows an example of statistics gathered during play of the game:

| Duration [min] | Number Passers-By | Interaction Time [min] | Number Looked | Number Stopped | Number Played | Avg. Play Time [min] |
|---|---|---|---|---|---|---|
| 84 | 325 | 25 (30%) | 58 (18%) | 28 (9%) | 15 (5%) | 1-2 (10 max) |

Figure 21:
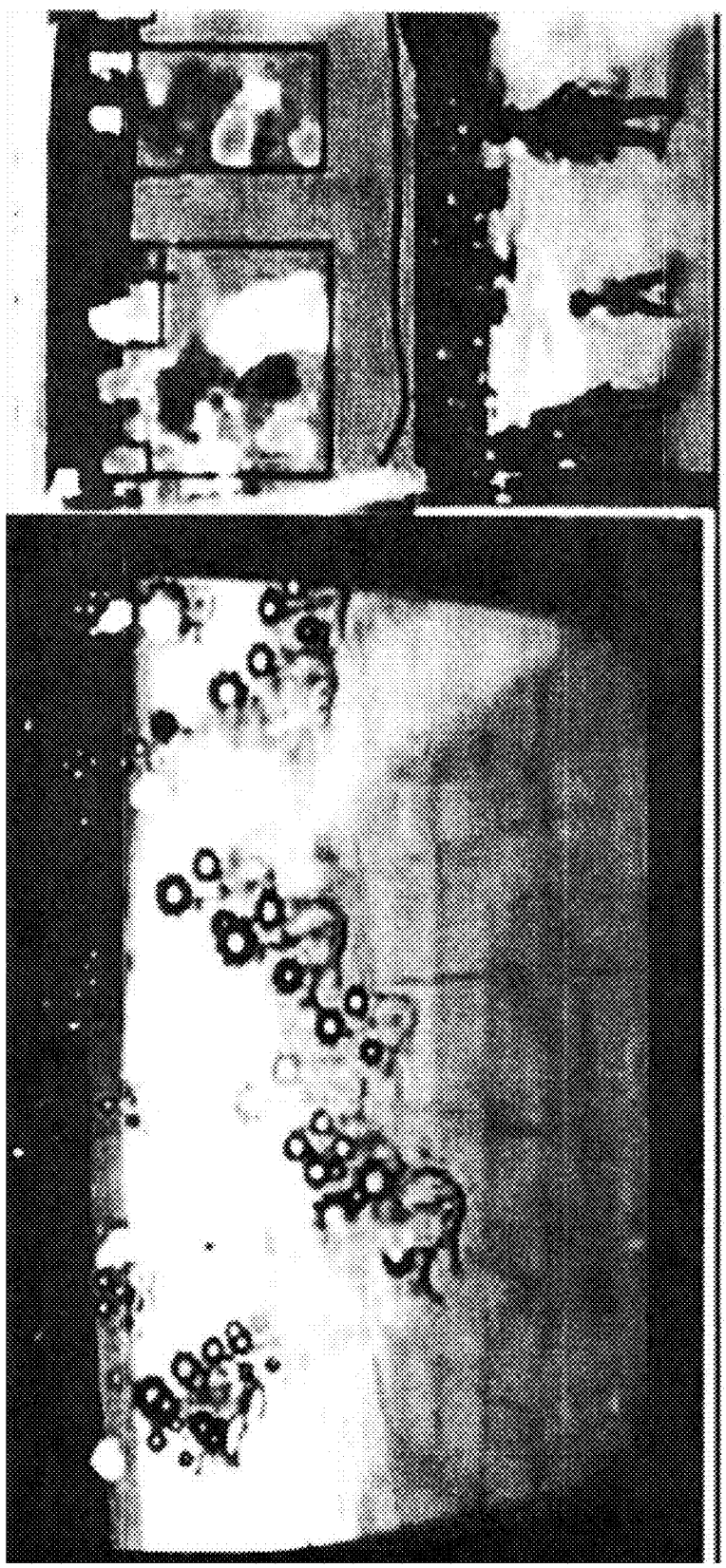
FIG. 21 shows a screen shot of one embodiment of a game.

FIG. 21 shows a screen shot of the game in action. In this shot, a video frame is shown to include the background of an outdoor square that is part of the campus of New York University's Polytechnic Institute. The people in the background image have been removed and replaced with flowers. The flowers are rendered at progressively larger scales from top to bottom of each frame to match the camera perspective and to give the illusion of growing out of the ground.

Two other optional video windows are shown at the right side of the background image. The bottom right window shows current video and the top right shows real-time Scene Activity Vector features as color overlays indicating different directions of motion (in this case 8 colors corresponding to 8 directions). In this window, correspondence among regions of activity, direction features, and flowers in varying stages of growth can be seen. Additional games may be implemented for educational purposes.

Advertising/Digital Signs.

The aforementioned method embodiments may also be applied to digital signs to be used for advertising, information, and/or entertainment purposes. For example, when applied to a digital advertising sign, the aforementioned method embodiments may determine the level of interest in a product or service being displayed on the sign. For example, when large crowds are detected, it may be assumed that the product or service has a great amount of appeal to the public. Such an application may therefore be implemented as part of a marketing strategy. (The embodiments may also be applied to non-digital signs).

Also, digital signs are transitioning from unidirectional (passive) information flow to having some degree of bidirectional (active) information transmission. For example, an active sign may one in which a display system captures information about people viewing the sign. The captured information may be processed for face recognition to determine the identity, age, and/or gender of viewers, as well as for determining a level of viewer attention or interest to the content of the sign, e.g., an advertised product or service. However, in these cases, no interaction takes place with the viewers.

In accordance with one embodiment, a different type of sign is provided in the form of an interactive display system. This system enables actions by one or more viewers to, for example, control the display and/or communicate with an authority managing the display system. One implementation corresponds to an interactive public camera system based on the ubiquitous nature of camera networks that have become available to the public.

Figure 22:
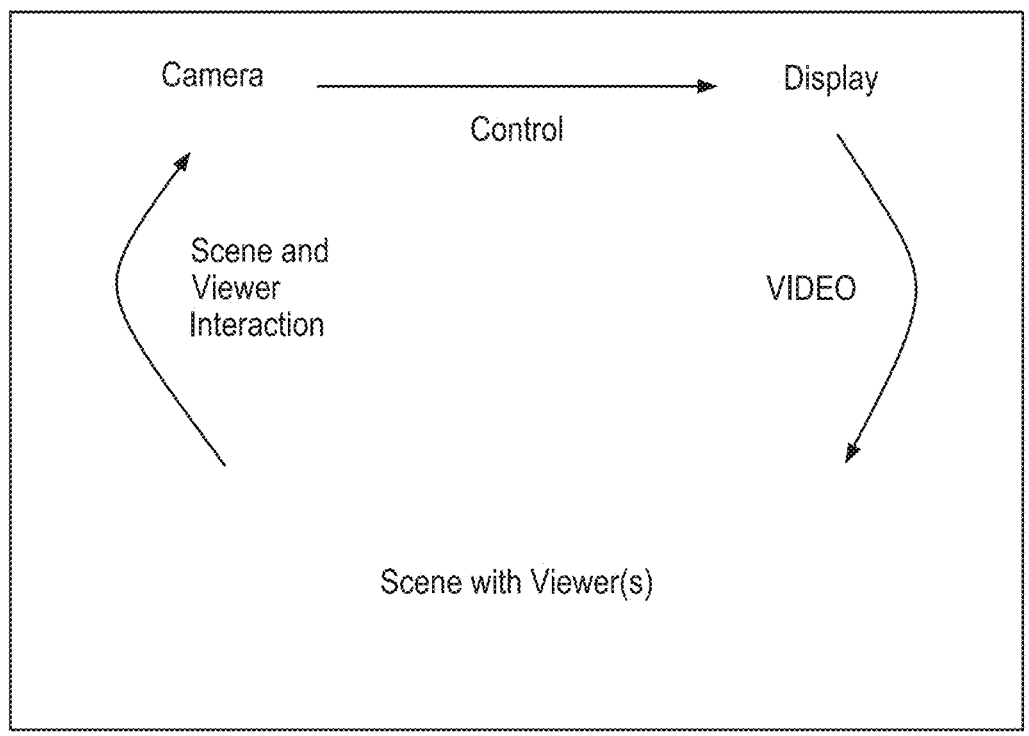
FIG. 22 shows an interactive digital sign application.

An example of this implementation is shown in FIG. 22, which shows interactive communication taking place between one or more viewers with the digital sign. In this example, a smart camera captures a scene which includes viewer(s) actively communicating through the camera to control contents of the display.

In another embodiment, a traditional sign may be used in an interactive manner with camera video. Also, in the foregoing embodiments, interaction may take place through a public monitor, smart phone, audio system, or a person might event appear upon visual request of a user. The interactivity of these embodiments is also suitable for use with crowds of people, not just one or two persons.

The foregoing embodiments therefore provide methods for performing motion feature filtering for detecting and/or classifying events from video of crowded and un-crowded scenes in various contexts and applications. Unlike other approaches, at least one of the present embodiments detects events based on motion edges, instead of regions. That is, one or more motion edges are detected in video frames, not fixed pixel block regions. Scene activity vectors are generated for these edges, and these vectors are then used to detect and/or classify events in the video.

Through this approach, higher level motion features may be statistically calculated from spatio-temporal gradients to add robustness with respect to lighting variations as compared with optical flow and other techniques.

According to one or more of these methods, a top-down approach is taken with respect to complexity and numbers of people and crowds. These embodiments may be also applied to show how motion features, event detection, and multi-scale representation are appropriate to detect different types of events or event characteristics. At least one of these methods involve the use of a score (or magnitude of activity), multi-scale location, direction, and temporal periodicity of score generated in association with a scene activity vector measured over time (or a number of video frames).

Figure 23:
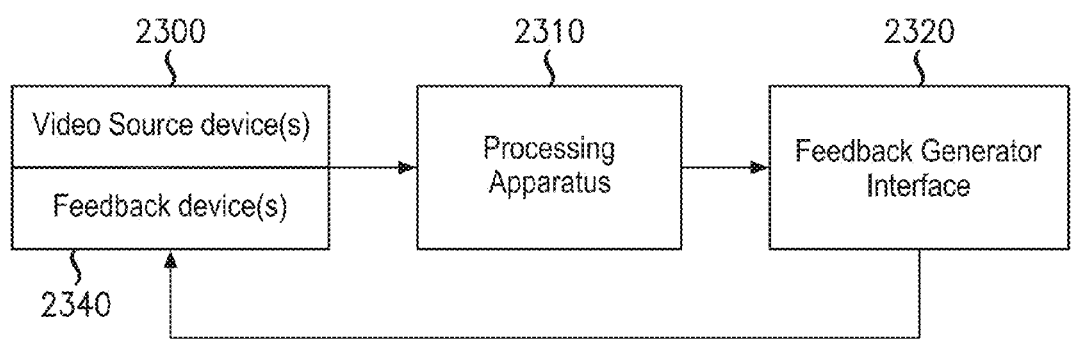
FIG. 23 illustrates a diagram of a system for implementing the interactive embodiments.

FIG. 23 illustrates a diagram of a system for implementing the interactive embodiments described above. As shown, one or more video source devices 2300 may be relatively colocated with one or more feedback devices 2340. The video source device 2300 may be a video camera, etc. The feedback device 2340 may be an audio device (speaker), video display, etc. A processing apparatus 2310 receives visual information from the video source device 2300, and sends output to a feedback generator interface 2320. The processing apparatus 2300 may be the apparatus of FIG. 1, wherein the video source 50 is a video source device 2300, and the display 70 may be form part of the feedback generator interface 2320. Based on event detection resulting from output of the processing apparatus 2310, the feedback generator interface 2320 may control the feedback devices 2340 to generate feedback information. For example, in the public picture phone embodiment, an official at the feedback generator interface 2320 may receive an alert from the processing apparatus 2320 (such as on the display 70), and the official may cause an alarm to played at a speaker (feedback device). Instead of relying on human intervention, the feedback generator interface 2320 may be fully automated. For example, in the gaming application, the game application running at the feedback interface 2320 (e.g., a computer system), converts the output of the processing apparatus 2310 into video patterns (e.g., flowers), and displays those video patterns on a display (feedback device).

The aforementioned applications of the event detection embodiments may therefore use video from one or more cameras to enable bidirectional communications in a variety of contexts including public safety, information, monitoring and tracking as well as to implement games.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method for processing information, comprising:
   receiving visual information including at least one object in motion;
   locating at least one spatial edge of the object in the visual information;
   generating a plurality of spatio-temporal gradients for the at least one spatial edge over N frames, where N≥3;
   generating motion blur images from the spatio-temporal gradients;
   performing a regression analysis on the motion blur images to determine direction of motion information of the object throughout the N frames;
   generating scene activity vectors for the N frames based on the direction of motion information; and
   detecting an event in the visual information based on the scene activity vectors generated for the N frames.

2. The method of claim 1, wherein the generating the spatio-temporal gradients includes:
   obtaining a spatial edge image for each of the N frames, and
   determining the spatio-temporal gradients based on a corresponding one of the spatial edge images and a moving average.

3. The method of claim 2, wherein the moving average is based on a background edge image.

4. The method of claim 2, wherein a region including the at least one spatial edge is smaller than a size of the N frames.

5. The method of claim 1, wherein a location of the object changes in one or more of the N frames.

6. The method of claim 1, wherein the generating the scene activity vectors for the N frames includes:
dividing each of the N frames into blocks;
determining feature parameters for each block;
generating a scene activity vector for each block; and
determining scene activity vectors for the N frames based on the scene activity vectors generated for each block of the N frames.

7. The method of claim 6, wherein the feature parameters include one or more of:
a first parameter based on a sum of non-zero direction values in a corresponding one of the blocks;
a second parameter based on a dominant direction in a corresponding one of the blocks;
a third parameter based on a dominant color in a corresponding one of the blocks;
a fourth parameter based an average velocity of movement in a corresponding one of the blocks;
a fifth parameter based on a degree of consistency or uniformity of motion directions of the object in a corresponding one of the blocks;
a sixth parameter based on density; or
a seventh parameter based on frequency in time.

8. The method of claim 7, wherein the second parameter is based on the motion vector information for a corresponding one of the blocks.

9. The method of claim 1, wherein the detecting an event includes:
identifying changes in the scene activity vectors the N frames; and
determining that an event has occurred when the changes in scene activity vectors has exceeded a threshold for at least K frames.

10. The method of claim 1, further comprising:
detecting a termination of the event when the scene activity vectors for M frames is less than the threshold, where M≤N.

11. The method of claim 1, wherein
the object is one or more persons, and
the event corresponds to movement of the one or more persons.

12. The method of claim 1, wherein
the object is traffic, and
the event corresponds to a type of traffic flow.

13. The method of claim 1, wherein
the object is an object in a game, and
the event corresponds to an activity in the game.

14. An apparatus for processing information, comprising:
a storage area configured to store a control program; and
a controller configured to process visual information based on the control program, the controller configured to process the visual information by
locating at least one spatial edge of an object in visual information;
generating a plurality of spatio-temporal gradients for the at least one spatial edge over N frames, where N≥3;
generating motion blur images from the spatio-temporal gradients;
performing a regression analysis to determine direction of motion information of the object throughout the N frames;
generating scene activity vectors for the N frames based on the direction of motion information; and
detecting an event in the visual information based on the scene activity vectors generated for the N frames.

15. The apparatus of claim 14, wherein the controller is configured to generate the spatio-temporal gradients by:
obtaining a spatial edge image for each of the N frames, and
determining the spatio-temporal gradients based on a corresponding one of the spatial edge images and a moving average.

16. The apparatus of claim 14, wherein the controller is configured to generate the scene activity vectors for the N frames by:
dividing each of the N frames into blocks;
determining feature parameters for each block;
generating a scene activity vector for each block; and
determining scene activity vectors for the N frames based on the scene activity vectors generated for each block of the N frames.

17. The apparatus of claim 16, wherein the feature parameters include one or more of:
a first parameter based on a sum of non-zero direction values in a corresponding one of the blocks;
a second parameter based on a dominant direction in a corresponding one of the blocks;
a third parameter based on a dominant color in a corresponding one of the blocks;
a fourth parameter based an average velocity of movement in a corresponding one of the blocks;
a fifth parameter based on a degree of consistency or uniformity of motion directions of the object in a corresponding one of the blocks;
a sixth parameter based on density; or
a seventh parameter based on frequency in time.

18. The apparatus of claim 14, wherein the controller is configured to detect the event in the visual information by:
identifying changes in the scene activity vectors the N frames; and
determining that an event has occurred when the changes in scene activity vectors has exceeded a threshold for at least K frames.

19. A system, comprising:
the apparatus according to claim 16;
one or more video sources configured to supply the visual information;
one or more feedback devices configured to generate feedback information; and
a feedback generator interface configured to present output from the processing apparatus, and configured to control the feedback devices to generate the feedback information.

20. The system of claim 19, wherein the feedback device is at least one of an audio presentation device and a video presentation device.

21. A non-transitory computer readable medium storing an executable set of instruction, which upon execution configure a processing apparatus to perform the method of claim 1.

* * * * *